United States Patent
Takahashi et al.

(10) Patent No.: US 6,353,809 B2
(45) Date of Patent: *Mar. 5, 2002

(54) SPEECH RECOGNITION WITH TEXT GENERATION FROM PORTIONS OF VOICE DATA PRESELECTED BY MANUAL-INPUT COMMANDS

(75) Inventors: Hidetaka Takahashi, Kunitachi; Takafumi Onishi, Tama, both of (JP)

(73) Assignee: Olympus Optical, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,996

(22) Filed: Jun. 2, 1998

(30) Foreign Application Priority Data

| Jun. 6, 1997 | (JP) | 9-149729 |
| Jan. 23, 1998 | (JP) | 10-011631 |
| Jan. 23, 1998 | (JP) | 10-011632 |

(51) Int. Cl.[7] .............................................. G10L 15/00
(52) U.S. Cl. ........................................................ 704/235
(58) Field of Search .............................. 704/235, 233, 704/225, 234, 251, 278

(56) References Cited

U.S. PATENT DOCUMENTS

| 4,829,576 A | * | 5/1989 | Porter | 704/235 |
| 5,799,273 A | * | 8/1998 | Mitchell et al. | 704/235 |
| 5,809,464 A | * | 9/1998 | Kopp et al. | 704/235 |
| 5,875,448 A | * | 2/1999 | Boys et al. | 707/531 |
| 5,893,900 A | * | 4/1999 | Matthews | 704/200 |
| 5,960,447 A | * | 9/1999 | Holt et al. | 707/500 |
| 5,974,373 A | * | 10/1999 | Chan et al. | 704/200 |
| 6,064,965 A | * | 5/2000 | Hanson | 704/275 |

FOREIGN PATENT DOCUMENTS

| EP | 0 293 264 A | 11/1988 |
| EP | 0 533491 A | 3/1993 |
| EP | 0 715 306 A | 6/1996 |

(List continued on next page.)

OTHER PUBLICATIONS

Anonymous: "Improved Correction Of Speech Recognition Errors Through Audio Playback", IBM Technical Disclosure Bulletin, vol. 36, No. 6A, Jun. 1993, pp. 153–154.

Weber: "Voice Input To A Computerized Patient Record: The Future Of Clinical Documentation", Database Inspec Institute of Electrical Engineers, Stevenage, GB Inspec No. 5786247, Abstract, & Proceedings Of TEPR '97. Toward And Electronic Patient Record '97, vol. 1, Apr. 27, 1997–May 3, 1997, pp. 304–305, Nashville, TN, US.

Primary Examiner—Talivaldis Ivars Smits
(74) Attorney, Agent, or Firm—Volpe and Koenig, P.C.

(57) ABSTRACT

A computer reads a voice speech recognition program from a first recording medium, and reads voice data from a second recording medium, and causes a CPU in the computer to recognize speech represented by the read voice data according to the speech recognition program, convert the result of speech recognition into text data, and display the converted text data on a display unit. A check mark button used by a speaker designates a portion of voice data, which is input through a microphone, corresponding to an unnecessary word or the like. The portion of the voice data in which a check mark is inscribed is not regarded as an object of speech recognition. Only the other portion of voice data in which the check mark is not inscribed is regarded as an object of speech recognition, and speech recognition is thus carried out. Furthermore, the sound level of a voice portion of voice data is rated. The gain of the voice data is adjusted according to the rated level. On the basis of the voice data whose sound level has been adjusted, speech recognition is carried out.

16 Claims, 20 Drawing Sheets

FOREIGN PATENT DOCUMENTS

| | | |
|---|---|---|
| JP | 59 112710 A | 6/1984 |
| JP | 04 347898 A | 12/1992 |
| JP | 5-231922 A | 9/1993 |
| JP | 07005893 A | 1/1995 |
| SU | 1 040 512 A | 9/1983 |

* cited by examiner

SPEECH RECOGNITION WITH TEXT GENERATION FROM PORTIONS OF VOICE DATA PRESELECTED BY MANUAL-INPUT COMMANDS

BACKGROUND OF THE INVENTION

The present invention relates to a speech recognition apparatus and a recording medium having a speech recognition program recorded therein. More particularly, this invention is concerned with a speech recognition apparatus for recognizing voice data, and a recording medium in which a speech recognition program causing a computer to recognize voice data is recorded.

SUMMARY

In recent years, research and development of speech recognition technology has been undertaken in earnest. A technological means capable of recognizing voice in real time has been proposed. This kind of technology has been adapted to various kinds of products or usages, for example, reservation of tickets by telephone or voice commanding within car navigation.

Along with a recent breakthrough in speech recognition technology and improvement in performance of personal computers, a technology for documenting voice input through a microphone connected to a personal computer by recognizing speech within application software running in the personal computer, and displaying the document has been developed.

An example of a software package enabling speech recognition is a product "Voice Type 3.0 for Windows 95" released recently by IBM Ltd. This product converts voice input through a microphone into text data in real time and enjoys a considerably high recognition ratio.

However, the application software permits real-time input through a microphone that is only one means for inputting voice data. An already existent voice file cannot be recognized directly.

One object of development of the aforesaid speech recognition technology is to realize a so-called speech word processor or a dictation system for automatically creating a document on the basis of voice data input by performing dictation, and displaying the document in a screen or the like.

A conventionally adopted means is such that when the contents of a document to be created are dictated and temporarily recorded by a recording apparatus such as a tape recorder, and a secretary, typist, or the like reproduces the dictated contents and documents them using a documentation apparatus such as a type writer, word processor, or the like. This style has been generally adopted as one form of effective utilization of the recording apparatus such as a tape recorder.

As for such dictational recording, a technique of appending an index mark or end mark to voice data so as to give instructions to a secretary or typist has been known in the past. According to a prior art of appending such a mark, a desired region of voice data is not designated as an interval but a specified region of voice data is designated as a point.

In the foregoing form of utilization in which a recording apparatus is used for dictation, the birth of a technology for automatically converting the contents of a record into a document has been greatly demanded in the past.

In actual dictation, a word irrelevant to contents to be informed may be contained. For example, when written sentences are recited, an incorrectly uttered word or a word having no meaning such as "Ah" or "Well" (hereinafter an unnecessary word) may be contained (frequently in some cases).

In this case, the performance of speech recognition deteriorates. This leads to a drawback that a document displayed in a screen contains many mistakes. A technology for constructing a dictation system by taking account of the above unnecessary words and creating language models that cover all words including the unnecessary words and that are intended to be used for speech recognition has been proposed in the past.

For example, according to Japanese Unexamined Patent Publication No. 7-5893, there is provided a speech recognition apparatus comprising: a standard pattern memory means for storing standard patterns; an unnecessary word pattern memory means for storing patterns of unnecessary words; a word spotting means for spotting as a word or word-spotting a standard pattern stored in the standard pattern memory means or a pattern of an unnecessary word stored in the unnecessary word pattern memory means on the basis of input voice, and outputting a corresponding interval and score; a producing means for hypothesizing the contents of uttered voice and producing a representation of the meaning; and an analyzing means for analyzing the result of word-spotting, which is performed by the word spotting means, on the basis of the representation of the meaning of the hypothesis produced by the producing means. The analyzing means allocates a score resulting from word-spotting performed on the pattern of an unnecessary word to remaining intervals, of which corresponding standard patterns or patterns of an unnecessary word have not been word-spotted, among all the intervals of data items constituting the voice. The result of word-spotting performed by the word spotting means is then analyzed.

However, the speech recognition apparatus described in the Japanese Unexamined Patent Publication No. 7-5893 has difficulty in carrying out practical processing within an existing computer (especially a computer of a personal level) because the data size of language models becomes enormous.

Using a currently commercialized product, a speaker must be careful in not uttering an unnecessary word or the like and cannot therefore help feeling clumsiness.

For improving the performance of speech recognition, it is required that the sound level of input voice is proper. Currently, it is hard to guarantee a high recognition ratio over a wide range of sound levels from a low level to a high level. A system is therefore designed to provide a maximum recognition ratio relative to an average sound level of voice.

In a speech recognition apparatus of a mode in which voice is input through a microphone as mentioned above, a sound-level meter for indicating a sound level of voice is displayed in, for example, a screen or the like so that a speaker himself/herself can manage his/her sound level of voice properly.

As an example of an embodiment of this technology, a sound pressure level display for a speech recognition apparatus comprising a first sound receiver for receiving a voice signal, a second sound receiver for receiving a noise whose level is close to that of the voice signal received by the first sound receiver, a sound pressure level ratio calculating means for calculating a ratio of a sound pressure level of a voice signal input to the first sound receiver to a ratio of a sound pressure level of a noise input to the second sound receiver, and a display means for displaying the ratio of sound pressure levels calculated by the sound pressure level ratio calculating means is described in Japanese Unexamined Patent Publication No. 5-231922.

However, it is annoying for a speaker to manage his/her own voice so that the sound level will become proper. There is therefore an increasing demand for a user-friendly speech recognition apparatus. Moreover, since the sound level of input voice cannot be detected using already recorded voice data, the technology disclosed in the Japanese Unexamined Patent Publication No. 5-231922 cannot be adapted as it is. It cannot be judged whether or not the sound level of voice data is suitable for speech recognition. Besides, since the sound pressure level display is not provided with a facility for adjusting a sound level of voice autonomously, a voice recognition ratio may vary abruptly depending on a sound level indicated by recorded voice data.

A first object of the present invention is to provide a speech recognition apparatus for recognizing speech represented by voice data recorded in a given recording medium and a recording medium in which a speech recognition program is recorded.

A second object of the present invention is to provide a speech recognition apparatus capable of treating an unnecessary word or the like contained in voice without the need of especially fast processing, and a recording medium in which a speech recognition program is recorded.

A third object of the present invention is to provide a speech recognition apparatus capable of recognizing speech on a stable basis irrespective of a sound level indicated by recorded voice data, and a recording medium in which a speech recognition program is recorded.

Briefly, a speech recognition apparatus in accordance with the present invention for recognizing speech within a programmed computer comprises a voice data reading means for reading voice data from a voice data recording medium in which the voice data is recorded, a speech recognizing means for recognizing speech represented by the voice data so as to convert the voice data into text data, and a display means-for displaying the text data.

A recording medium in accordance with the present invention having a speech recognition program recorded therein is used to run the speech recognition program in a computer, whereby the speech recognition program causes the computer to read voice data from a voice data recording medium in which the voice data is recorded, recognize speech represented by the voice data so as to convert the voice data into text data, and display the text data.

These as well as other objects and advantages of the present invention will become further apparent from the following detailed explanation.

DETAILED DESCRIPTION OF THE PREFERRED EMBODIMENTS

Figure 1:
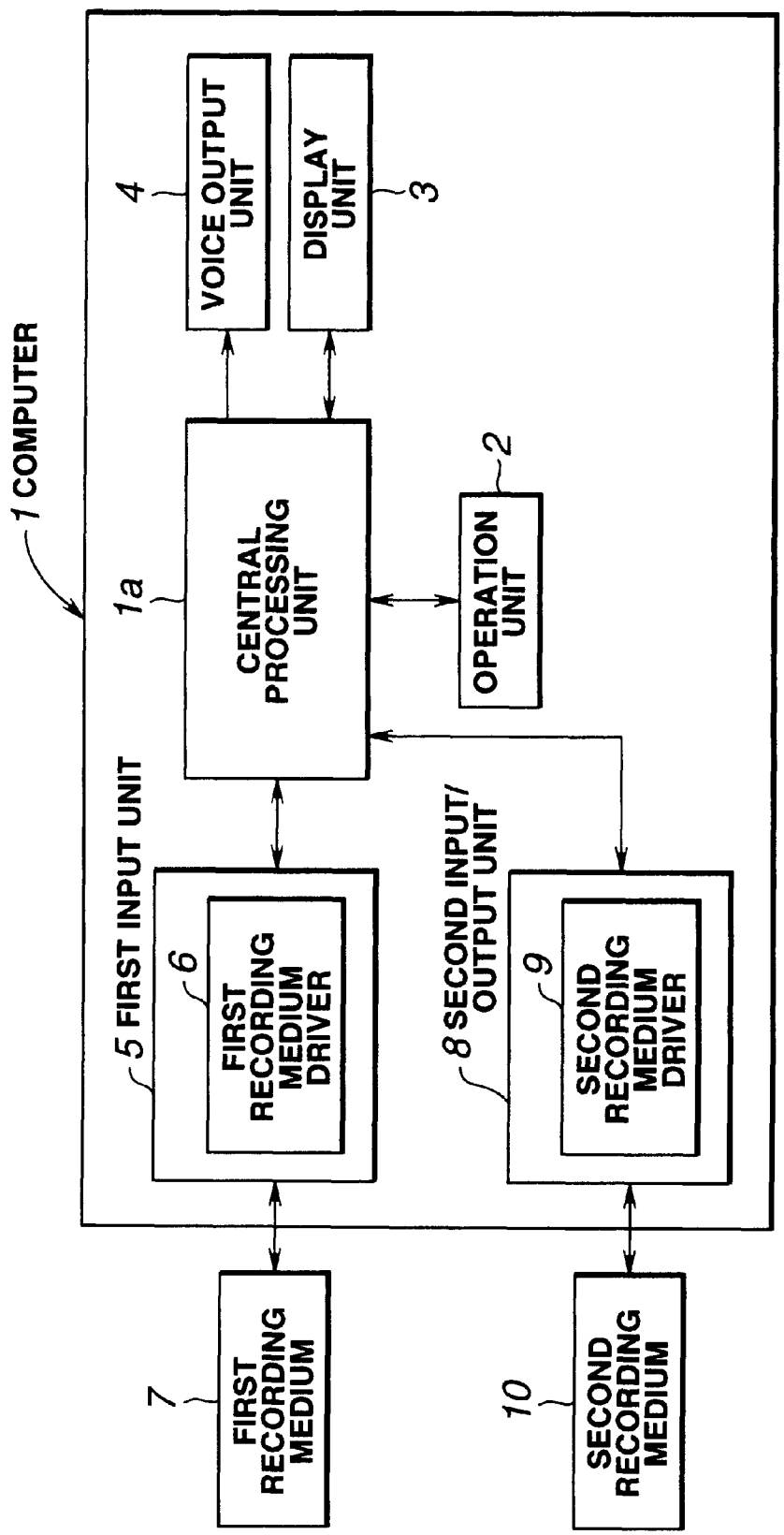
FIG. 1 is a block diagram schematically showing the configuration of a computer that is the first embodiment of a speech recognition apparatus in accordance with the present invention.

Referring to the drawings, embodiments of the present invention will be described below.

FIG. 1 is a block diagram schematically showing the configuration of a computer that is the first embodiment of a speech recognition apparatus in accordance with the present invention.

A computer 1 consists, as shown in FIG. 1, mainly of: a central processing unit (CPU) 1a responsible for control of the whole computer 1; a first input unit 5 in which an external recording medium (first recording medium 7,) having a given program recorded therein can be freely mounted; a first recording medium driver 6, incorporated in the first input unit 5, for reading a given program from the first recording medium 7 under the control of the CPU 1a when the first recording medium 7 is mounted in the first input unit 5; a second input/output unit 8 in which an external recording medium (second recording medium 10) having given voice data recorded therein can be freely mounted; a second recording medium driver 9, incorporated in the second input/output unit 8, for reading given voice data and writing given data from and in the second recording medium 10 under the control of the CPU 1a when the second recording medium 10 is mounted in the second input/output unit 8; an operation unit 2 for inputting a given instruction entered by a user; a display unit 3 serving as a display means for displaying given data after given processing is carried out by the CPU 1a; and a voice output unit 4 for outputting produced voice after given processing is carried out by the CPU 1a.

The computer 1 is configured to permit operation of an operation system (OS) capable of executing a plurality of application software concurrently (multitasking). Hereinafter, a description will be made on the assumption that the OS is installed in the computer 1.

The first recording medium 7 is a recording medium in which a given speech recognition program is recorded. In this embodiment, for example, a portable recording medium such as a CD-ROM or floppy disk is imagined as the recording medium.

Moreover, the second recording medium 10 is a voice data recording medium in which given voice data is recorded. The second recording medium 10 will be described below.

The second recording medium 10 is a recording medium in which voice data acquired by an external solid-state recorder is recorded. In this embodiment, a card-shaped recording medium that is a flash memory is imagined.

In recent years, there has been an increasing demand for a flash memory. Digital solid-state recorders using the flash memory as a recording medium have been commercialized. The flash memory is known in many types of card-shaped recording media. For example, a memory card conformable to the PCMCIA standard, a miniature card manufactured by Intel Corp., an SSDFC manufactured by Toshiba Co., Ltd., and a compact flash memory manufactured by SunDisk Co., Ltd. are known.

In general, these card-shaped flash memories are connected to a personal computer via an adaptor or the like, and capable of transferring given data. Many of the existing card-shaped memories have a storage capacity ranging from 2 M bytes to 8 M bytes. Moreover, the digital solid-state recorders currently on the market include those capable of recording sound in a card having a storage capacity of 2 M bytes for 20 min. to 40 min.

The solid-state recorders convert an analog signal input through a microphone into digital PCM data, which is digital data modulated in pulse code, or the like, compresses the PCM data according to an algorithm for encoding based on the ADPCM or CELP, and records compressed data in a flash memory card. The thus recorded data can be read directly by a personal computer via an adaptor.

The computer 1 of this embodiment reads voice data from the flash memory card (second recording medium 10) mounted as mentioned above.

Next, a speech recognition operation for recognizing speech represented by voice data which is carried out by the computer 1 will be described.

To begin with, a user mounts a recording medium (first recording medium 7), in which a given speech recognition program is recorded, in the first input unit 5 of the computer 1. The computer 1 reads a given speech recognition program, which is application software, from the connected first recording medium 7 into an internal memory, which is not shown, via the first recording medium driver 6. This causes the CPU 1a to control a speech recognition operation following the program.

Now, the speech recognition operation to be carried out according to the speech recognition program will be described.

Figure 2:
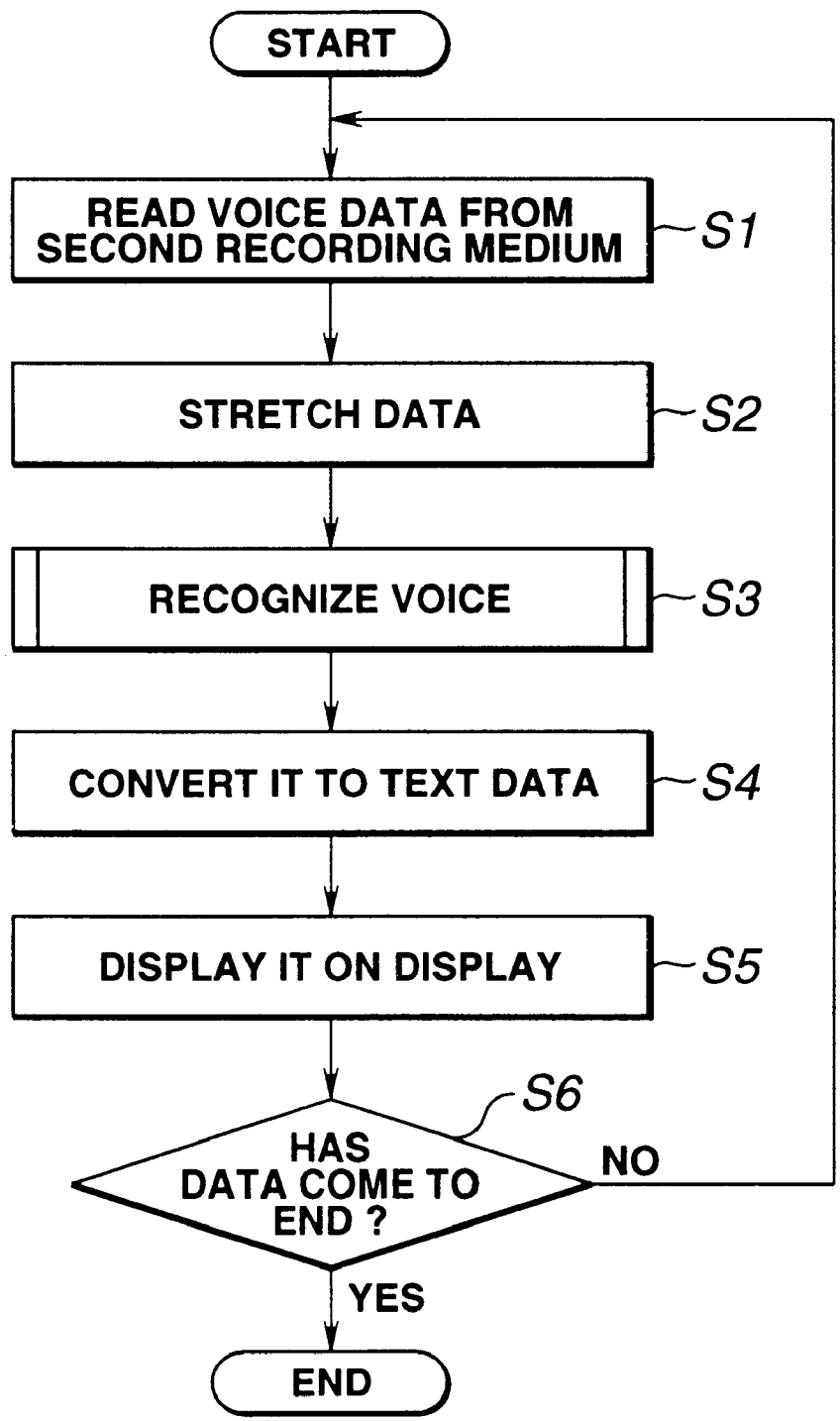
FIG. 2 is a flowchart describing the first example (first speech recognition program) of a speech recognition program recorded in a recording medium in accordance with the present invention having the speech recognition program recorded therein, and run in the first embodiment.

FIG. 2 is a flowchart describing the first example (first speech recognition program) of a speech recognition program recorded in the recording medium in accordance with the present invention having the speech recognition program recorded therein.

When the second recording medium 10 is mounted in the computer 1, the CPU 1a reads voice data from a voice compressed file containing voice data compressed and recorded by an external solid-state recorder (step S1). The first speech recognition program stretches compressed voice data into PCM data by reversely following a compression algorithm according to which data is recorded by the solid-state recorder (step S2). In other words, this processing that is identical to reproduction performed by the solid-state recorder is carried out by the computer 1 controlled by the first speech recognition program.

The PCM data stretched at step S2 is subjected to speech recognition (step S3). The speech-recognized data or data recognized in speech is converted into text data (step S4), and the converted text data is displayed on a display (display unit 3) (step S5). This processing is continued until the speech-recognized data comes to an end (step S6).

Figure 3:
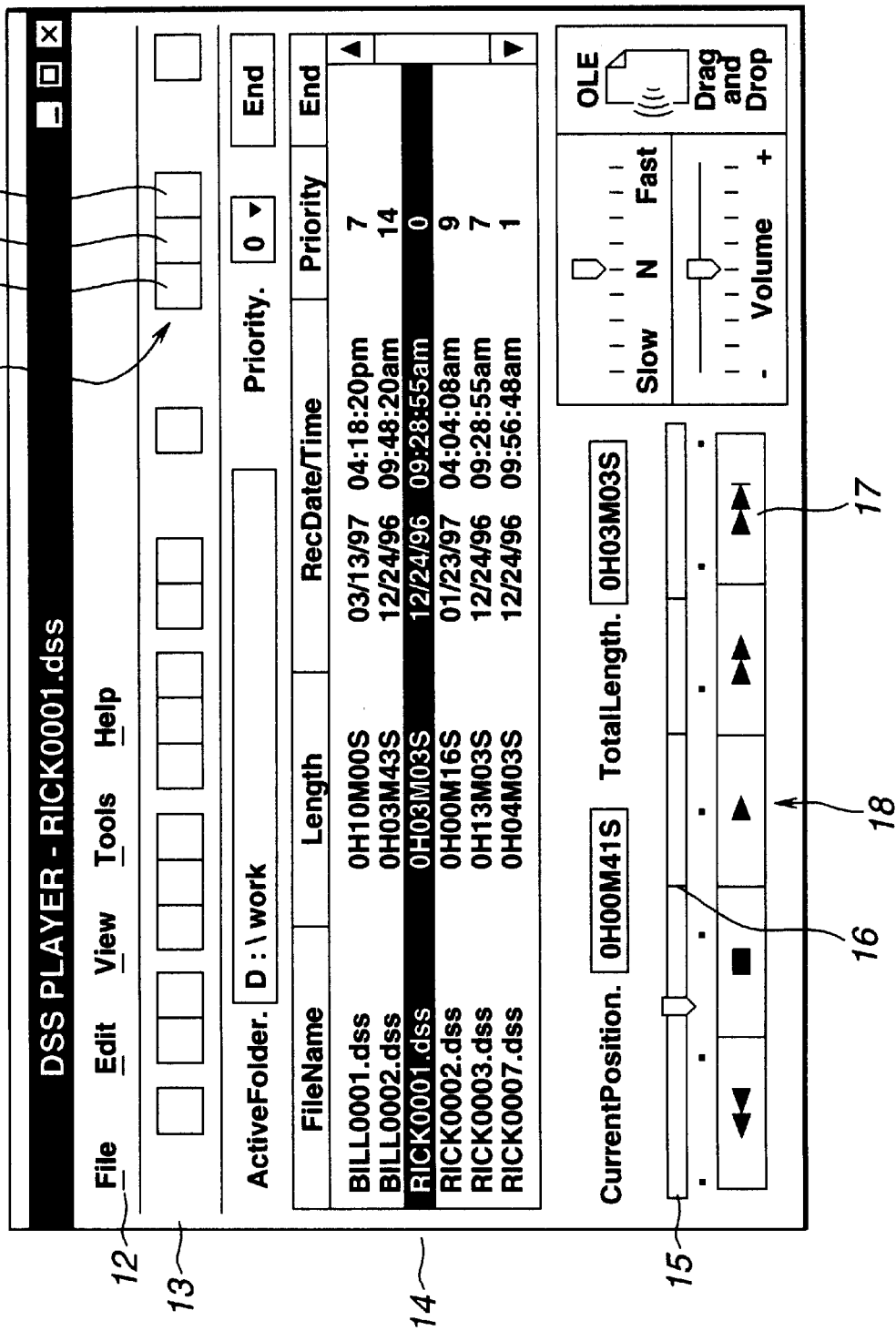
FIG. 3 is a diagram showing an example of display appearing when speech recognition application software read from the first recording medium is activated in the computer of the first embodiment, or a main screen used to reproduce compressed voice data.

FIG. 3 shows an example of a display appearing when the speech recognition application software read from the first recording medium 7 is activated in the computer 1 of this embodiment, or a main screen used to reproduce speech data that is compressed data representing voice.

FIG. 3 shows a main screen 11 in which: a menu bar 12 used to select file-related handling or editing-related handling; a tool button bar 13 presenting easily discernibly various kinds of handling in the form of icons; a voice file list box 14 which displays a list of information such as names of voice files transferred from the second recording medium 10, recording times, dates of recording, and priorities and in which a voice file whose data is reproduced or speech-recognized is highlighted in contrast with the other voice files; and a reproduction control 18 used to carry out processing such as replay, stop, fast feed, or fast return are displayed.

The tool button bar 13 is provided with a speech recognition tool button group 21 consisting of a speech recognition start button 22, word recognition button 23, and list display button 24.

Figure 4:
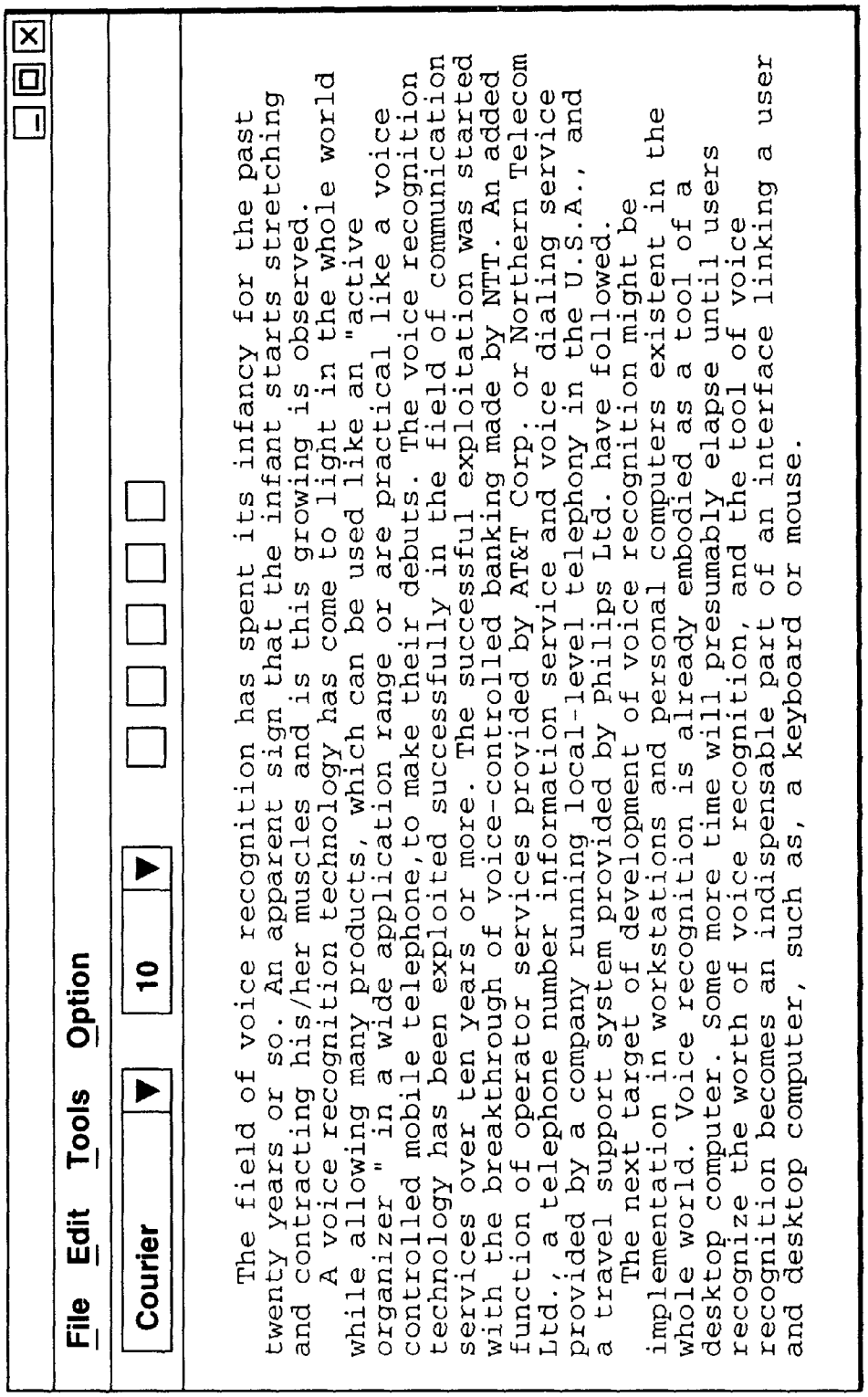
FIG. 4 is a diagram showing an example of a screen in which text data is displayed when the speech recognition application software read from the first recording medium is activated in the computer of the first embodiment.

Moreover, the reproduction control 18 is provided with a current position-of-reproduction indicator slider 15, lines 16, and an index search button 17. In the main screen 11 shown in FIG. 3, when the speech recognition start button 22 belonging to the speech recognition tool button group 21 included in the tool button bar 13 is pressed, speech recognition of a voice file highlighted in the voice file list box 14 is started. A text editor shown in FIG. 4 is started up. Recognized speech data is displayed as serial text data in the editor screen.

Next, a processing operation of recognizing a given number of words at intervals of a given time since the start of a file subjected to speech-recognition and displaying a list of the words will be described.

The list display button 24 belonging to the speech recognition tool button group 21 is a button used to recognize a certain number of words at intervals of a certain time since the start of a file subjected to speech recognition, and display the words in the form of a list.

Figure 5:
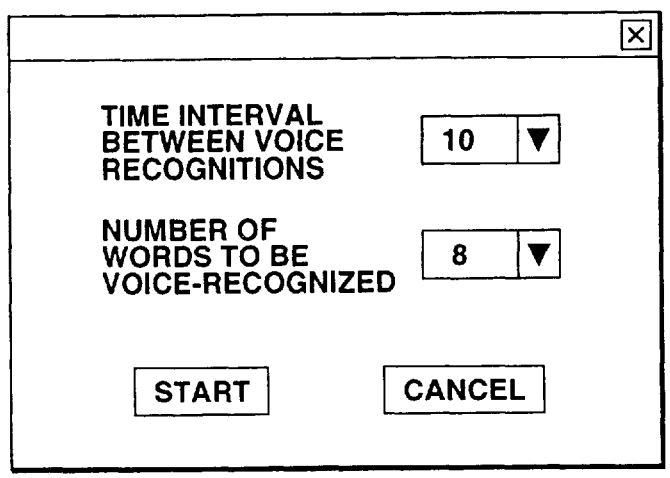
FIG. 5 is a diagram showing an example of a dialog box screen used to set a time interval between speech recognitions and the number of displayed words when a given number of words are recognized at intervals of a given time since the start of a file subjected to speech recognition, after the speech recognition application software read from the first recording medium is activated in the computer of the first embodiment.

When the list display button 24 is pressed, a dialog box shown in FIG. 5 appears. A user is prompted to enter the setting of a time in seconds, at intervals of which words will be recognized, since the start of a file (file subjected to speech recognition) highlighted in the voice file list box 14, and the setting of the number of words to be recognized and displayed. If the user wants to suspend the processing, he/she presses a cancel button shown in FIG. 5. Thus, control can be returned to the main screen shown in FIG. 3.

Figure 6:
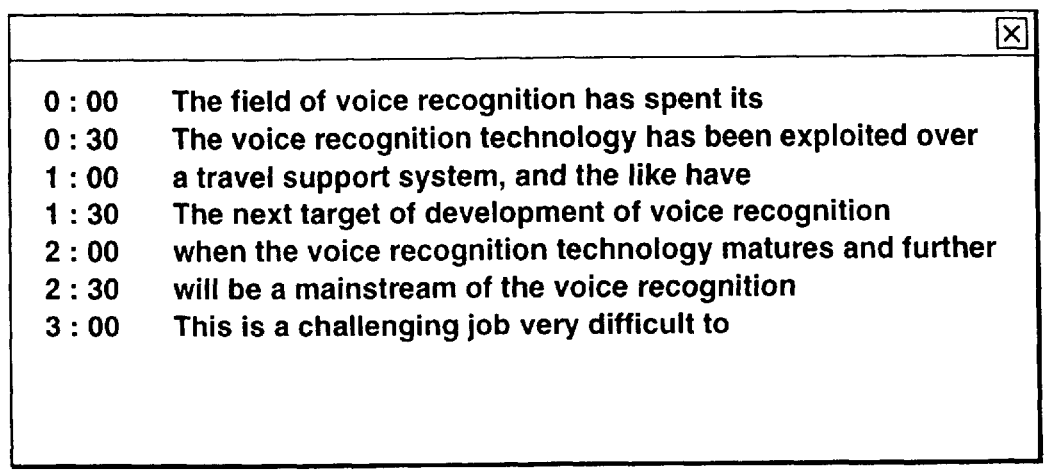
FIG. 6 is a diagram showing an example of a screen in which a given number of words recognized at intervals of a given time since the start of a file subjected to speech recognition after the speech recognition application software read from the first recording medium is activated in the computer of the first embodiment is displayed.

When the user enters the setting of the time interval and the setting of the number of words to be recognized and presses the start button, the dialog box shown in FIG. 5 is closed and a list box shown in FIG. 6 appears.

Figure 7:
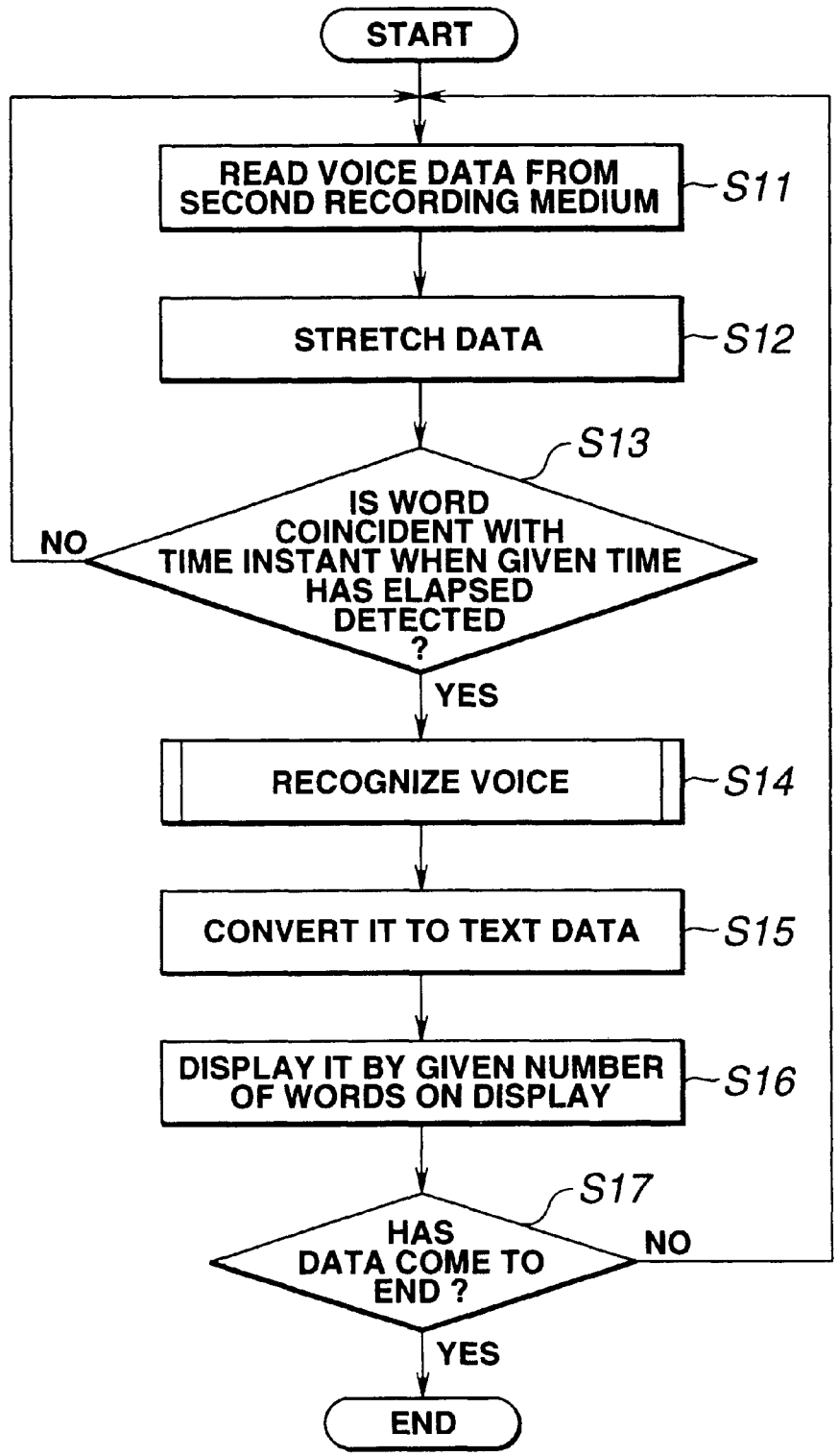
FIG. 7 is a flowchart describing a second example (second speech recognition program) of a speech recognition program recorded in a recording medium in accordance with the present invention having the speech recognition program recorded therein, and run in the first embodiment.

FIG. 7 is a flowchart describing the second example (second speech recognition program) of a speech recognition program recorded in a recording medium in accordance with the present invention having the speech recognition program recorded therein. Herein, a processing operation of recognizing a given number of words at intervals of a certain time since the start of a file subjected to speech recognition, and displaying the words in the form of a list is described.

Specifically, when the user sets the time interval and the number of words to be recognized, and then presses the start button, voice data is first read from a file subjected to speech recognition and recorded in the second recording medium 10 (step S11). The second speech recognition program stretches the compressed voice data in the same manner as the first speech recognition program (step S12). If a word coincident with a time instant when the set time has elapsed is detected (step S13), stretched PCM data starting with the word is speech-recognized (step S14).

The speech-recognized data is converted into text data (step S15), and the converted text data is, as shown in FIG. 6, displayed by the given number of words on the display (display unit 3). Specifically, in the list box shown in FIG. 6, display of a position-of-reproduction time passed since the start of the speech-recognized file and display of text data starting at the position of reproduction are carried out sequentially by the number of words set in the dialog box shown in FIG. 5. This processing is terminated when data comes to an end (step S17).

Next, a processing operation of recognizing speech started at a given position in a file subjected to speech recognition will be described.

When the position of reproduction indicated by the current position-of-reproduction indicator slider 15 in the main screen 11 shown in FIG. 3 is changed, if the speech recognition start button 22 belonging to the speech recognition tool button group 21 is pressed, speech recognition is started at the changed position of reproduction. The result of speech recognition then appears in the text editor screen shown in FIG. 4.

Figure 8:
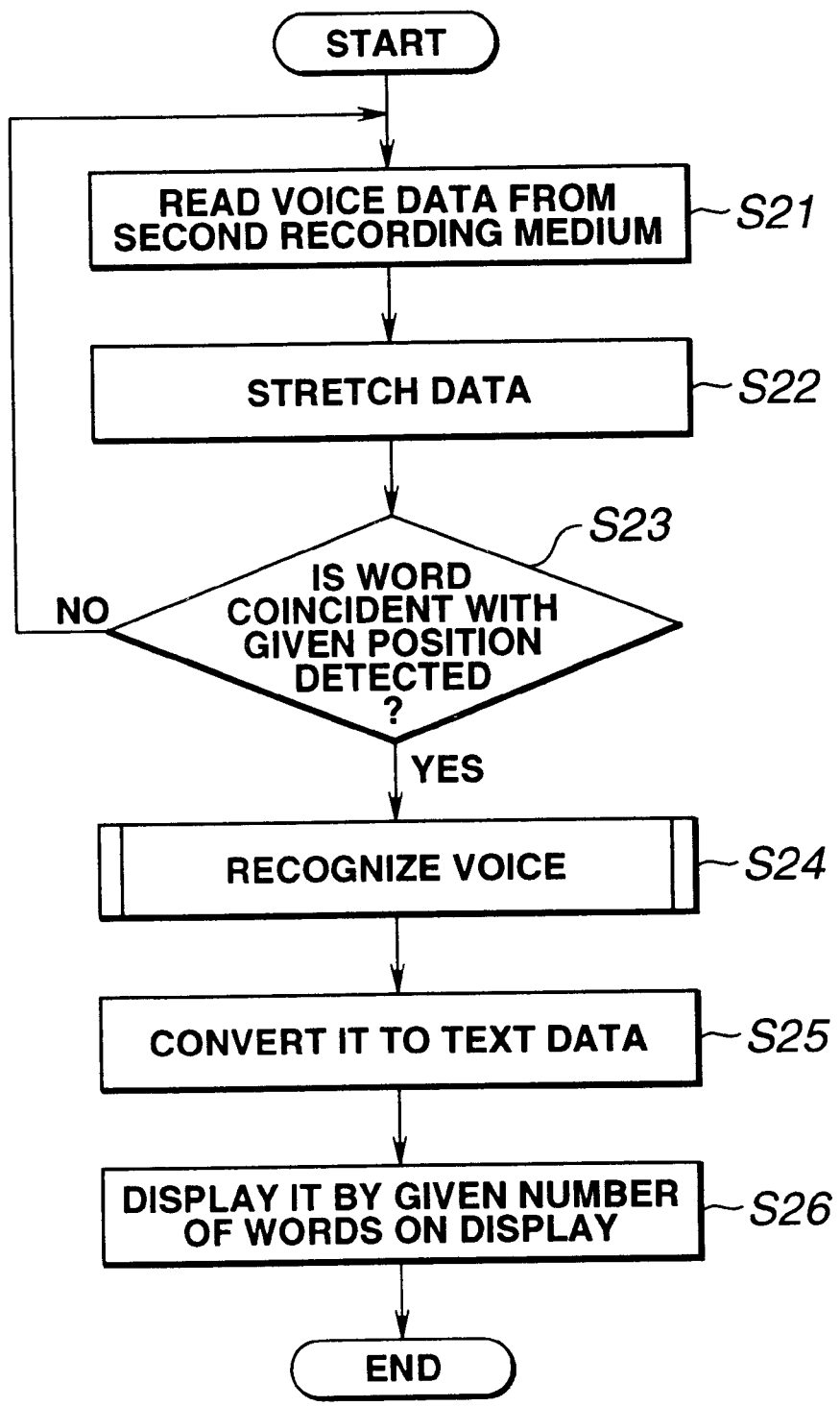
FIG. 8 is a flowchart describing a third example (third speech recognition program) of a speech recognition program recorded in a recording medium in accordance with the present invention having the speech recognition program recorded therein, and run in the first embodiment.

FIG. 8 is a flowchart describing the third example (third speech recognition program) of a speech recognition program recorded in a recording medium in accordance with the present invention having the speech recognition program recorded therein, wherein a processing operation of starting speech recognition at a given position in a file subjected to speech recognition and displaying the result is described.

Specifically, when a user changes the position of reproduction indicated by the current position-of-reproduction indicator slider 15 shown in FIG. 3, voice data is read from a file subjected to speech recognition in the second recording medium (step S21). The third speech recognition program stretches compressed voice data in the same manner as the first speech recognition program (step S22). If a word coincident with a given position is detected (step S23), stretched PCM data starting with the word at the given position is speech-recognized (step S24).

The speech-recognized data is converted into text data (step S25), and the converted text data is displayed on the display (display unit 3) (step S26). In other words, text data starting at the given position set in the editor screen shown in FIG. 4 is displayed. This processing is terminated when data comes to an end.

Next, a processing operation of speech-recognizing a desired word, which should be speech-recognized, among those contained in a file subjected to speech recognition, and indicating the positions of the desired word will be described.

The word recognition button 23 belonging to the speech recognition tool button group 21 shown in FIG. 3 is a button for use in speech-recognizing a desired word, which should be speech-recognized, among those contained in a file subjected to speech recognition, and indicating the positions of the desired word. Specifically, when the word recognition button 23 is pressed, only the word that should be speech-recognized is retrieved from a voice-compressed file by carrying out speech recognition. Retrieved locations are indicated with the lines 16 in the current position-of-reproduction indicator slider 15 so that they can be discerned at sight. The details will be described below.

Figure 9:
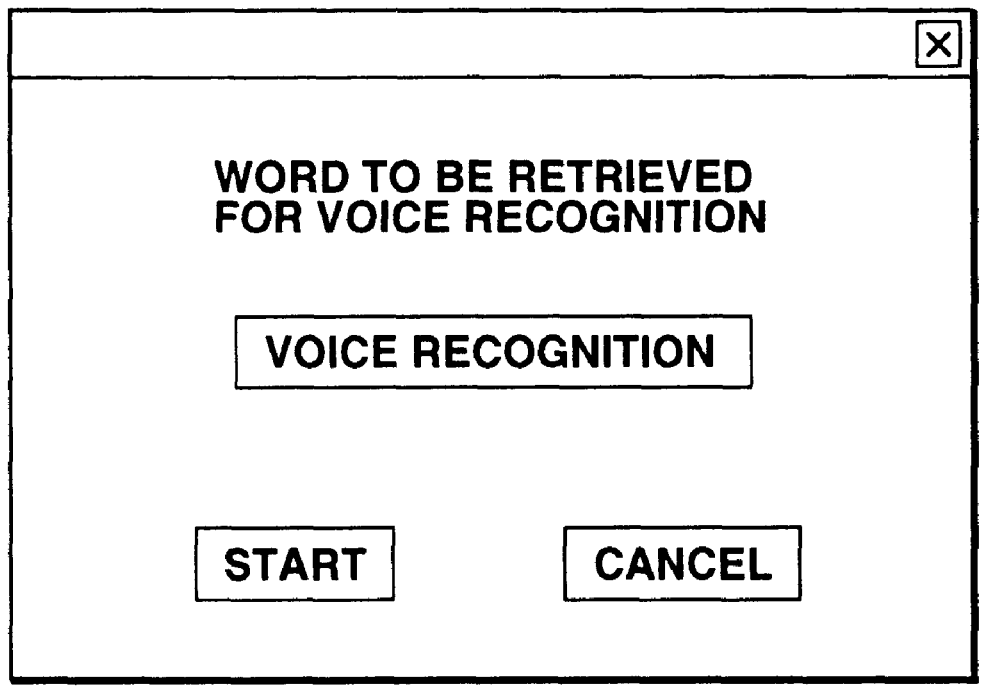
FIG. 9 is a diagram showing an example of a dialog box screen used to set a word to be retrieved for speech recognition when only a word that must be recognized in speech and contained in a voice compressed file is recognized in speech after the speech recognition application software read from the first recording medium is activated in the computer of the first embodiment.

When the word recognition button 23 is pressed, the dialog box shown in FIG. 9 appears. With the dialog box, a user is prompted to enter a specified word that should be recognized. For suspending this processing, the cancel button is pressed. The processing is then exited and the main screen shown in FIG. 3 is returned.

Figure 10:
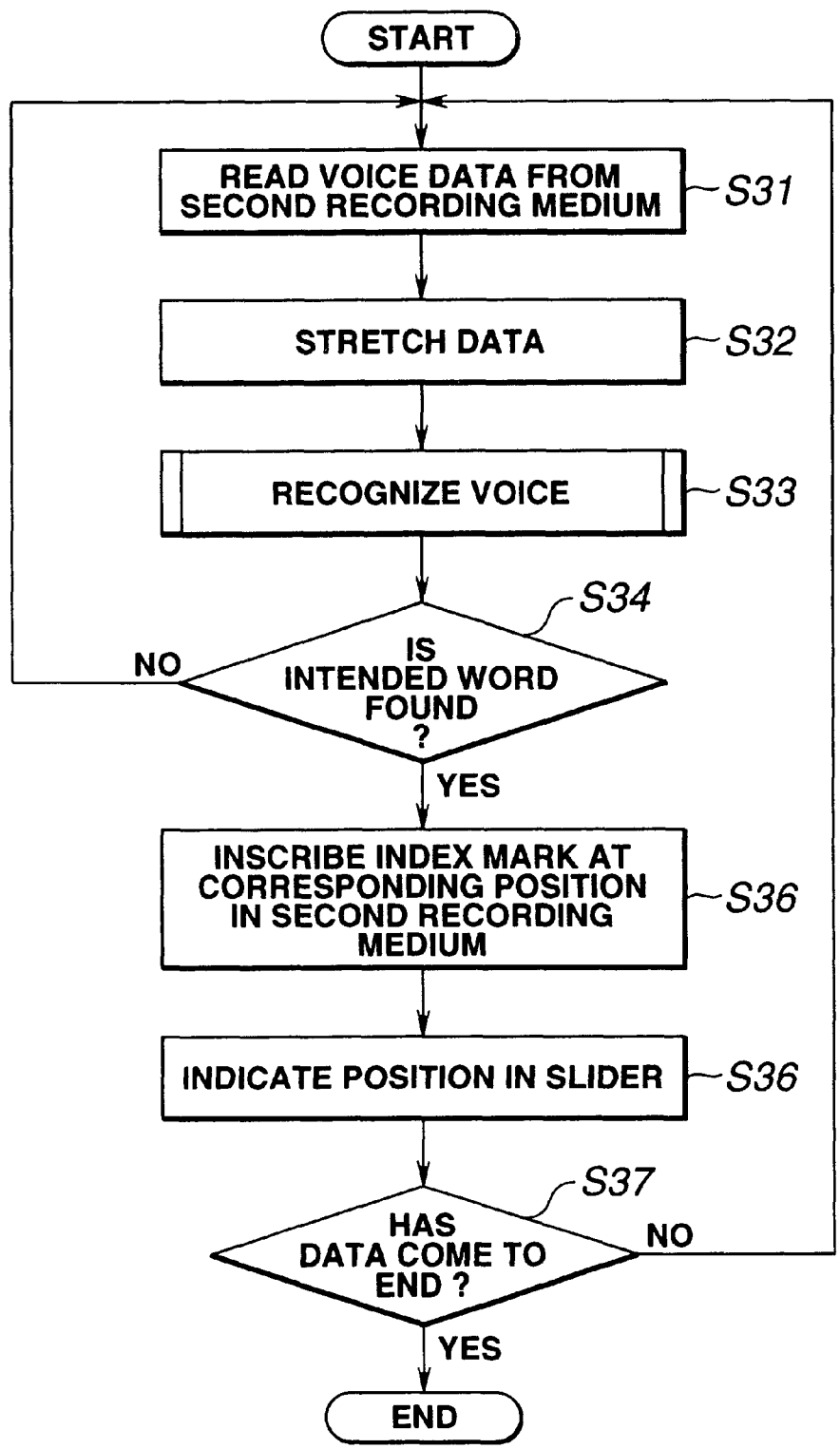
FIG. 10 is a flowchart describing a fourth example (fourth speech recognition program) of a speech recognition program recorded in a recording medium in accordance with the present invention having the speech recognition program recorded therein, and run in the first embodiment.

FIG. 10 is a flowchart describing the fourth example (fourth speech recognition program) of a speech recognition program recorded in a recording medium in accordance with the present invention having the speech recognition program recorded therein, wherein a processing operation of speech-recognizing desired words alone, which should be speech-recognized, among those contained in a file subjected to speech recognition, and indicating the positions of the desired words is described.

Specifically, after a desired word that should be recognized is entered in the screen shown in FIG. 9 by a user, when the start button is pressed, voice data is read from a file subjected to speech recognition in the second recording medium (step S31). The fourth speech recognition program stretches compressed voice data in the same manner as the first speech recognition program (step S32). Speech recognition is then started at the start of the selected voice-compressed file (step S33).

Thereafter, when the word registered in the dialog box shown in FIG. 9 is recognized from among those contained in the file subjected to speech recognition (step S34), the positions of the word are indicated with the lines 16 in the current position-of-reproduction indicator glider 15 in the main screen 12 shown in FIG. 3. An index mark is inserted into a voice data item coincident with the position. Every time the index search button 17 in the reproduction control 18 in the main screen 11 shown in FIG. 3 is pressed, control is skipped sequentially to one of the positions indicated with the lines 16 (step S35 and step S36). This facility can be validated not only when reproduction is stopped but also when reproduction is under way.

When speech recognition involving the end of the voice-compressed file is completed, all the positions at which the registered word is found are indicated with the lines 16 in the current position-of-reproduction indicator slider 15.

This processing is terminated when data comes to an end (step S37).

Next, a processing operation of deleting a portion of voice data corresponding to a designated portion of text data from a file subjected to speech recognition will be described.

Figure 11:
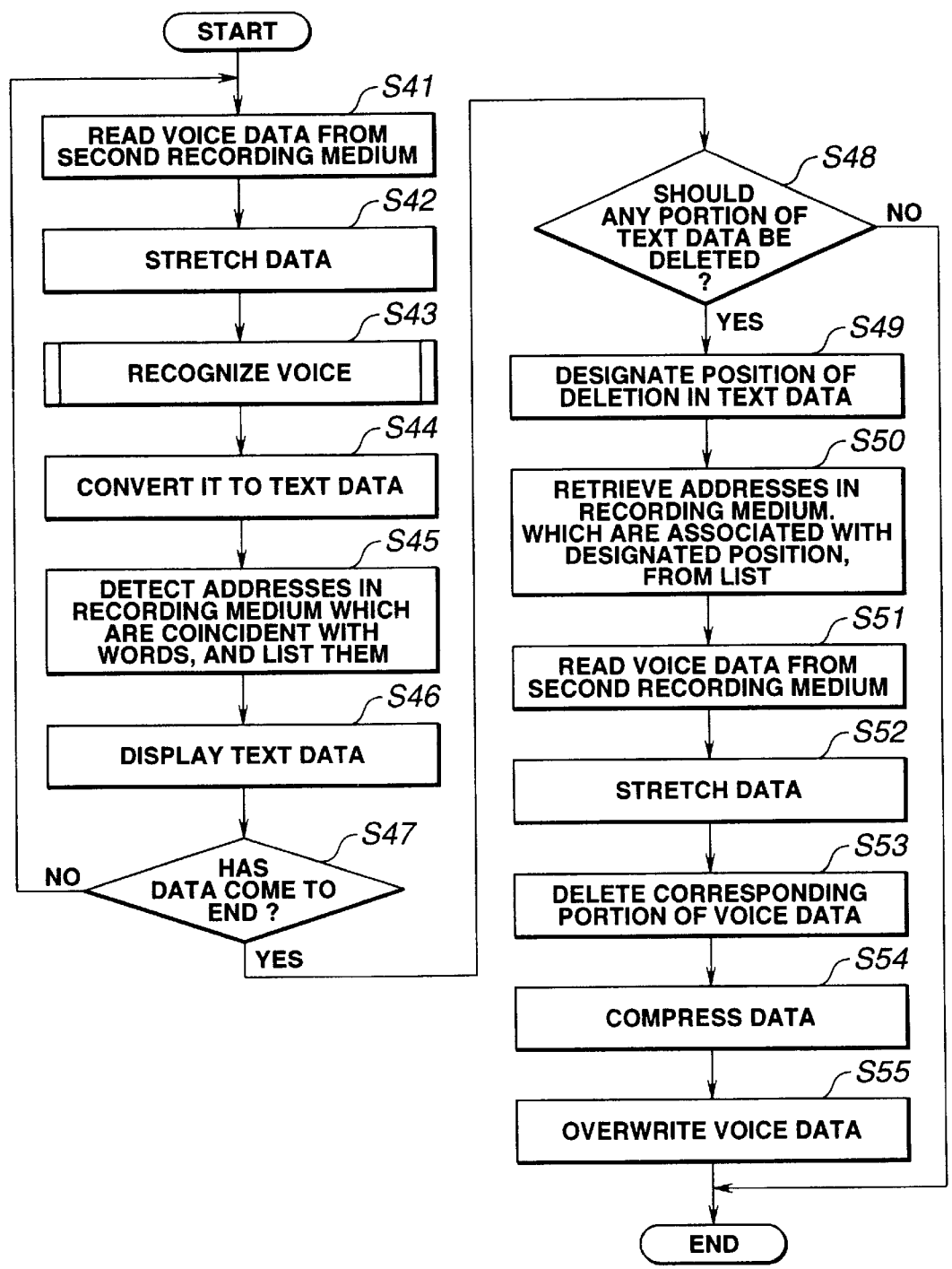
FIG. 11 is a flowchart describing a fifth example (fifth speech recognition program) of a speech recognition program recorded in a recording medium in accordance with the present invention having the speech recognition program recorded therein, and run in the first embodiment.

FIG. 11 is a flowchart describing the fifth example (fifth speech recognition program) of a speech recognition program recording in a recording medium in accordance with the present invention having the speech recognition program recorded therein, wherein a processing operation of deleting a portion of voice data corresponding to a designated portion of text data from the second recording medium 10 is described.

First, voice data is read from a file subjected to speech recognition in the second recording medium 10 (step S41). The fifth speech recognition program stretches compressed voice data in the same manner as the first speech recognition program (step S42). The stretched PCM data is speech-recognized (step S43).

The speech-recognized data is converted into text data (step S44). Addresses in the second recording medium 10 associated with words are detected and then listed (step S45). Table 1 indicates the addresses in the second recording medium 10 allocated to an example of text data "The sky is blue and the ocean is also blue."

TABLE 1

| | Text Word | Leading and last addresses in a recording medium |
|---|---|---|
| 1 | the | 3468H |
| | | 3492H |
| 2 | sky | 3494H |
| | | 3560H |

TABLE 1-continued

| | Text Word | Leading and last addresses in a recording medium |
|---|---|---|
| 3 | is | 3580H |
| | | 3600H |
| 4 | blue | 3610H |
| | | 3620H |
| 5 | and | 3622H |
| | | 3640H |
| 6 | the | 3692H |
| | | 3699H |
| 7 | ocean | 3706H |
| | | 3720H |
| 8 | is | 3724H |
| | | 3736H |
| 9 | also | 3740H |
| | | 3753H |
| 10 | blue | 3760H |
| | | 3770H |

Thereafter, the above text data is kept displayed on the display until the data comes to an end (step S46 and step S47).

When data comes to an end, it is judged whether or not the text data should be deleted (step S48). If the data should be deleted, a position of deletion is designated in the text data (step S49). Addresses in the second recording medium 10 associated with the designated position are retrieved from Table 1 (step S50).

Thereafter, voice data is read from the second recording medium 10 (step S51), and stretched (step S52). The portion of the voice data defined by the addresses is deleted (step S53). Thereafter, the voice data is compressed again (step S54) and then overwritten (step S55).

In this embodiment, addresses are listed so that a position of deletion in text data can be associated with a position in the second recording medium. The present invention is not limited to this mode. For example, times passed since the start of a file may be recorded in the form of a list.

According to the speech recognition program of the first embodiment recorded in a recording medium to be adapted to a computer, a CPU is conventionally requested to exhibit a great processing capability because when voice output through a microphone is recognized directly, speech recognition must be carried out in real time. However, since stretching of a voice-compressed file and speech recognition should merely be repeated, the advantage that real-time processing is not required and the CPU is not requested to exhibit a great processing capability is exerted.

Moreover, since real-time processing is not required, there is the advantage that an algorithm permitting speech recognition with high precision can be created.

Furthermore, since the contents of a portion of a voice-compressed file can be discerned at sight, what is recorded at which position of reproduction can be grasped broadly.

Only a portion of an existing voice-compressed file which should be converted into text data need be speech-recognized.

In addition, control can be skipped spontaneously from an existing voice-compressed file to the position of a word serving as a keyword. A position of the word that should be retrieved can be reached at once.

Furthermore, even after data is recorded, since a word can be designated later and an index mark can be inscribed in the recorded data, usefulness improves. Besides, even after data is recorded, since an unnecessary word can be designated later and deleted from the recorded data, an unsuccessful dictation can be deleted easily.

In the computer 1 of the first embodiment, the first recording medium 7 is an external recording medium. After a recording medium having a given speech recognition program recorded therein is mounted in the computer 1, the given speech recognition program that is application software can be read from the recording medium. The present invention is not limited to this mode. Alternatively, any mode will do as long as a given speech recognition program can be activated by working on the CPU 1a in the computer.

For example, the computer 1 may be provided with a recording medium having a speech recognition program recorded therein in advance so that the speech recognition program can be read any time.

Figure 12:
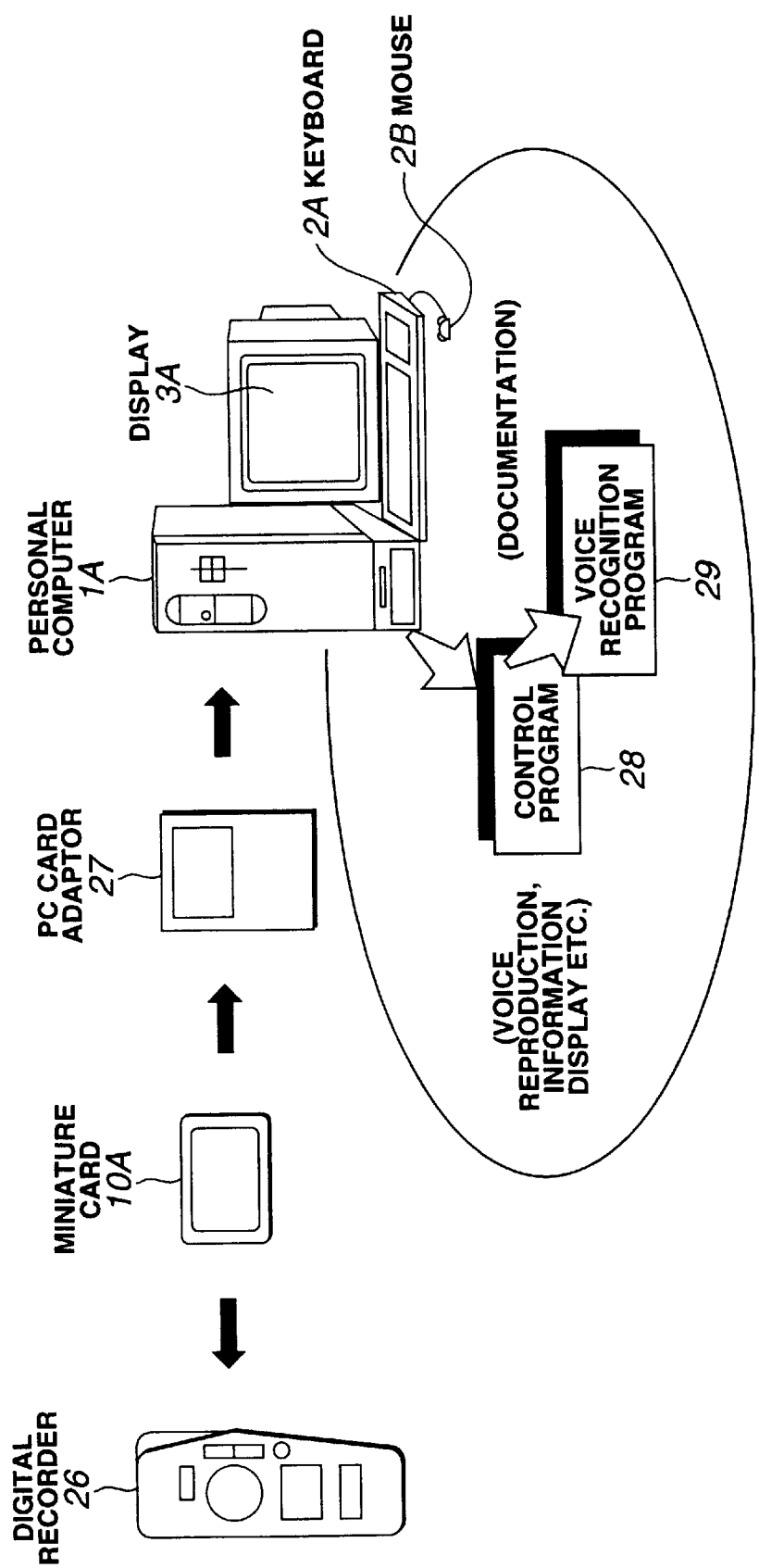
FIG. 12 is a conceptual diagram showing the overall configuration of a dictation system of the second embodiment of the present invention.

FIGS. 12 to 17 relate to the second embodiment of the present invention. FIG. 12 is a conceptual diagram showing the overall configuration of a dictation system to which the present invention is adapted.

The dictation system comprises: as shown in FIG. 12, a digital recorder 26 that is a voice recording apparatus for converting voice into an electric signal and producing voice data; a miniature card 10A, freely detachably attached to the digital recorder 26, serving as a voice data recording medium in which voice data is recorded; a PC card adaptor 27 used to insert the miniature card 10A into a PC card slot 9A (See FIG. 16) to be described later for connection; and a personal computer 1A including a display 3A serving as a display means, and a keyboard 2A and mouse 2B serving as an operation unit, and acting as a speech recognition apparatus for processing voice data read from the miniature card 10A through the PC card slot 9A according to a control program 28 or a speech recognition program 29.

Figure 13:
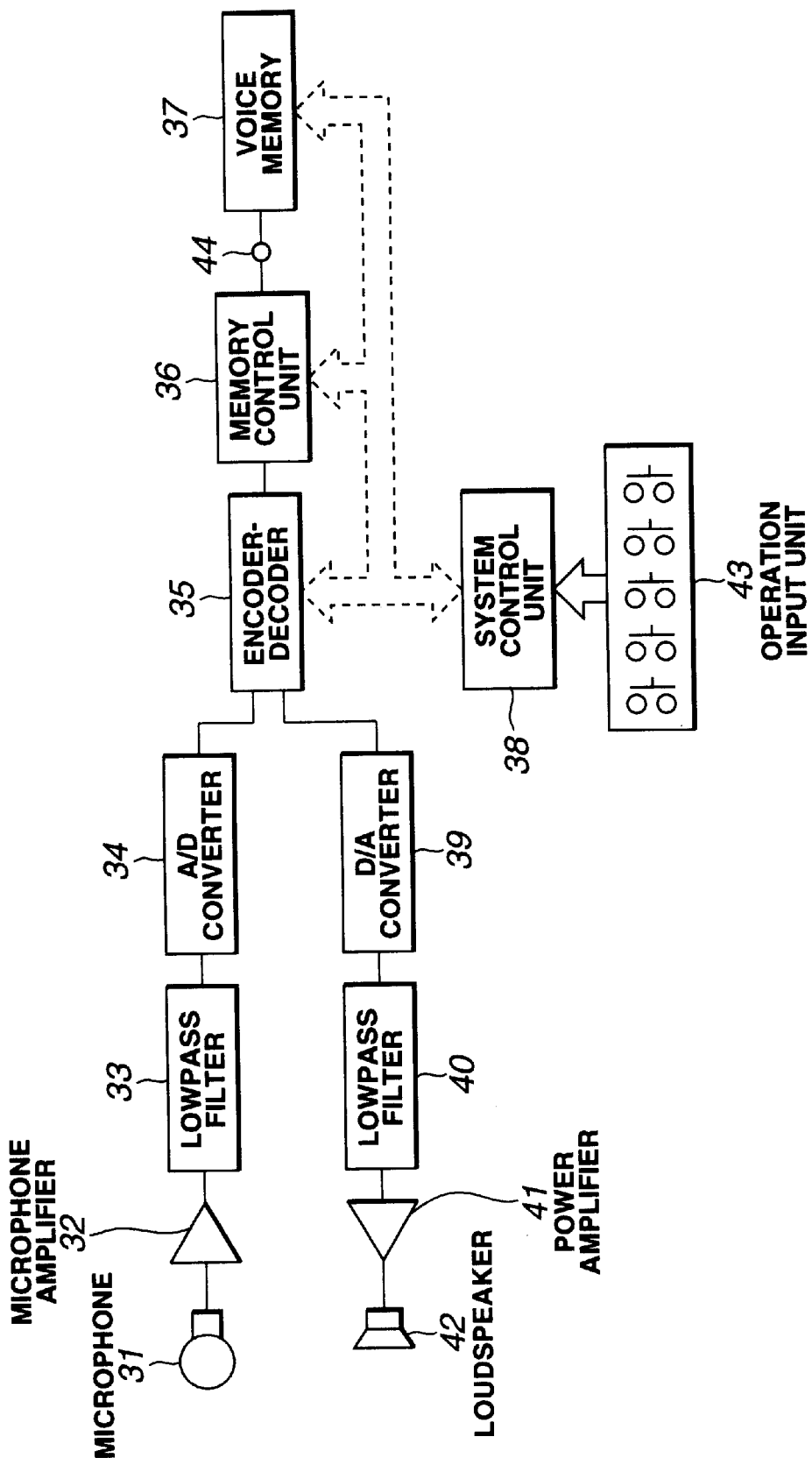
FIG. 13 is a block diagram showing the electrical configuration of a digital recorder of the second embodiment.

FIG. 13 is a block diagram showing the electrical configuration of the digital recorder 26.

The digital recorder 26 comprises: as shown in FIG. 13, a microphone 31 serving as a voice data input means for inputting voice and converting it into an electric signal; a microphone amplifier 32 for amplifying a voice signal sent from the microphone 31 to a proper level; a lowpass filter 33 for removing unnecessary high-frequency components from the voice signal amplified by the microphone amplifier 32; an A/D converter 34 for converting an analog voice signal output from the lowpass filter 33 into digital data; an encoder-decoder 35 for encoding (compressing) the digitized voice signal during a recording operation, and decoding (stretching) encoded data during a reproduction operation; a memory control unit 36 serving as a recording means for controlling recording or reproduction of voice information in or from a voice memory 37, which will be described later, on the basis of address information given by a system control unit 38 to be described later; a voice memory 37 incorporated in the miniature card 10A serving as a voice data recording medium and formed with, for example, a semiconductor memory; a miniature card attachment 44 serving as a recording medium attaching means enabling the miniature card 10A including the voice memory 37 to be freely attached or detached to or from the digital recorder 26; a D/A converter 39 for converting the digital voice signal output from the encoder-decoder 35 into an analog signal; a lowpass filter 40 for removing unnecessary high-frequency components from a voice signal converted into an analog form by the D/A converter 39; a power amplifier 41 for amplifying an analog voice signal output from the lowpass filter 40; a loudspeaker 42 for uttering sound when driven by the power amplifier 41; an operation input unit 43 composed of various kinds of operation buttons including a check mark button 43a (See FIG. 14) to be described later; and a system control unit 38 that controls the digital recorder 26 including the encoder-decoder 35, memory control unit 36, and voice memory 37 in a centralized manner and that serves as a recording means to which an output terminal of the operation input unit 43 is connected.

Figure 14:
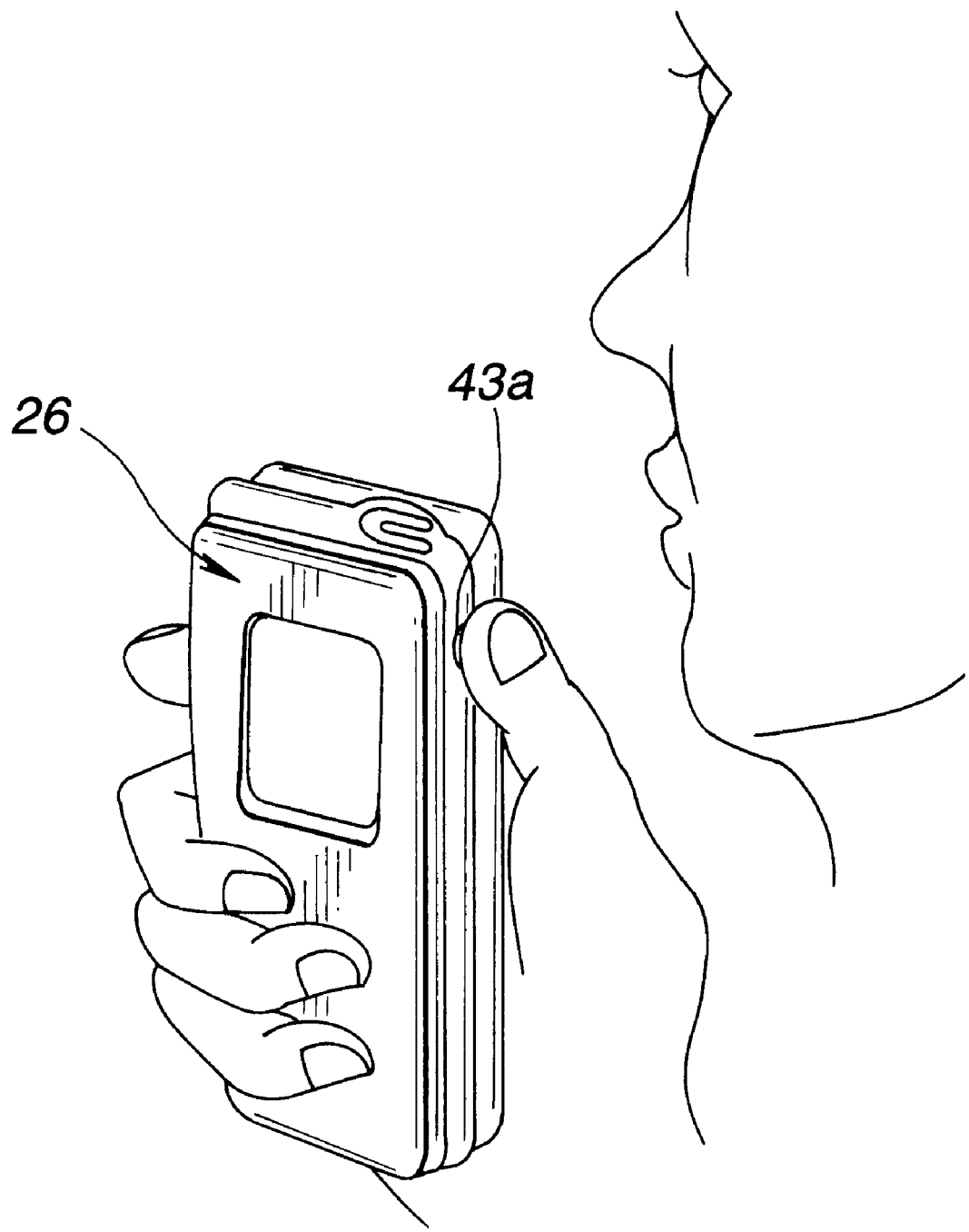
FIG. 14 is a diagram showing a scene in which a check mark button of the digital recorder is handled during dictation in the second embodiment.

FIG. 14 is a perspective view showing a scene in which the check mark button of the digital recorder is handled during dictation.

The check mark button 43a serving as an interval designating means of the operation input unit 43 is, as shown in FIG. 14, located at a position enabling the thumb of a hand, by which the digital recorder 26 is held, to easily operate the check mark button. The check mark button is a button to be pressed in order to append a check mark, which indicates that an uttered word is an unnecessary word, to voice data when an unnecessary word or the like is uttered while the contents of a document to be created are being dictated.

The unnecessary word or the like is uttered unconsciously. The instant an unnecessary word was uttered, a speaker can recognize the uttered word as an unnecessary word. Since the check mark button 43a is located at a position enabling the speaker to press it easily, a check mark can be appended readily if necessary.

Figure 15:
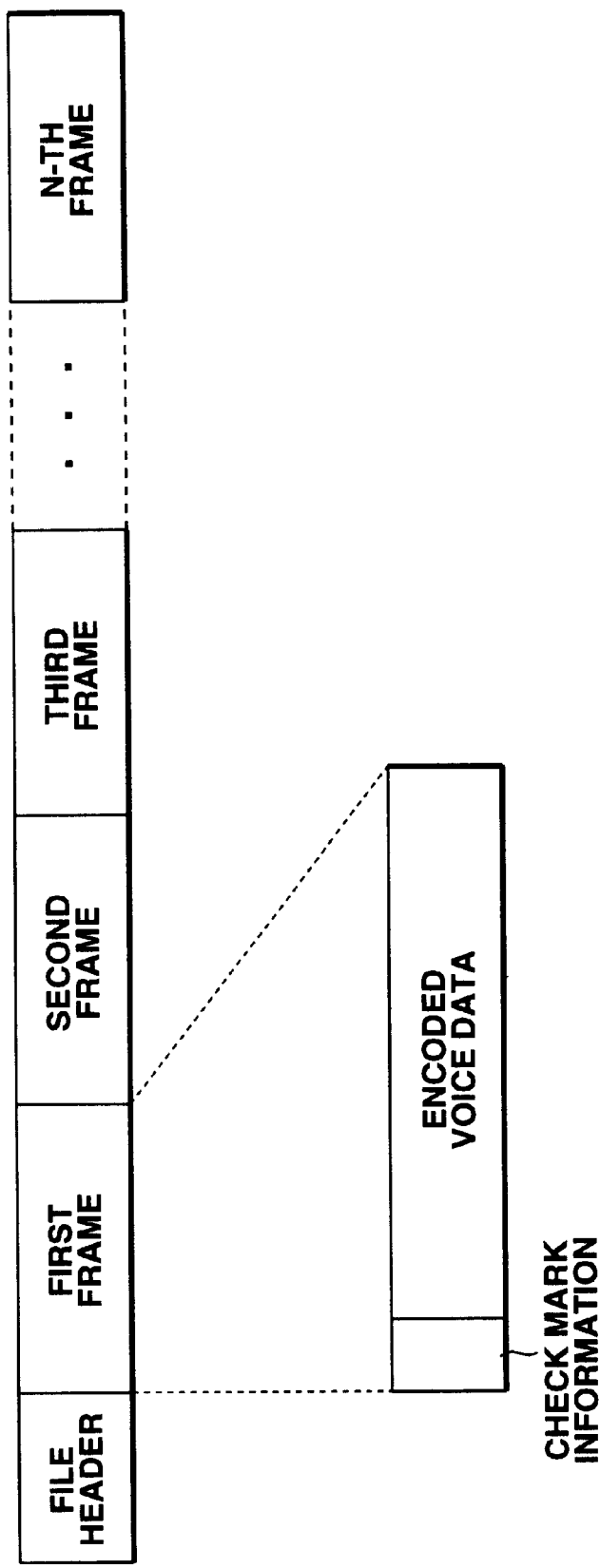
FIG. 15 is a diagram showing the format of data to be recorded in a voice memory of a miniature card by means of the digital recorder of the second embodiment.

FIG. 15 is a diagram showing the format of data to be recorded in the voice memory 37 in the miniature card 10A by the digital recorder 26.

One record data is managed in the form of a file. In each file, information, for example, a date of recording and a recording time is written as a file header. In the remaining area, data divided into frames are written.

Moreover, each frame includes check mark information indicating whether or not the check mark button 43a has been pressed, and encoded voice data. The check mark information is structured as, for example, a flag of, for example, 1 bit long. When the check mark button 43a is pressed, the flag is set to "1." When the check mark button 53a is not pressed, the flag is set to "0."

Figure 16:
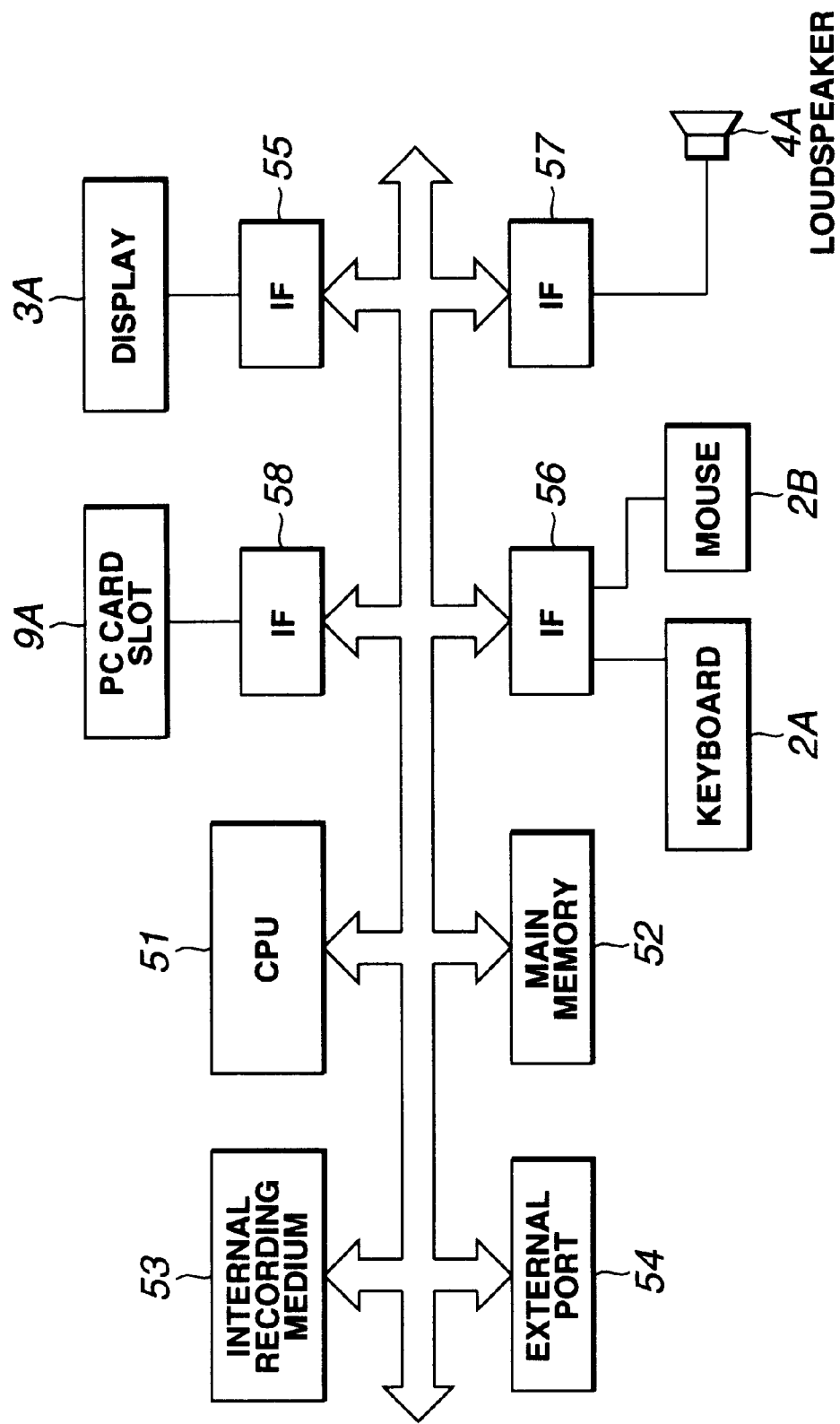
FIG. 16 is a block diagram showing the electrical configuration of a personal computer of the second embodiment.

FIG. 16 is a block diagram showing the electrical configuration of the personal computer 1A.

The personal computer 1A carries out voice reproduction, information display, and the like according to the control program 28, carries out documentation according to the speech recognition program 29, and also carries out various kinds of processing according to the other various kinds of program. The personal computer 1A comprises: a CPU 51 serving as a detecting means, a level adjusting means, a speech recognizing means, a voice rating means, a minimum value calculating means, a gain value calculating means, a multiplying means, and an averaging means; a main memory 52 serving as a recording medium offering a work area for the CPU 51; an internal recording medium 53 serving as a recording medium which is formed with, for example, a hard disk or floppy disk and in which the control program 28 and speech recognition program 29 are recorded; an external port 54 used to connect the personal computer to various kinds of external equipment; an interface 55 used to connect the display 3A to the personal computer; an interface 56 used to connect the keyboard 2A or mouse 2B; a loudspeaker 4A that is a voice output unit for uttering sound on the basis of voice data; an interface 57 used to connect the loudspeaker 4A; a PC card slot 9A which serves as a voice data reading means and into which the miniature card 10 attached to the PC card adaptor 27 is inserted; and an interface 58 used to connect the PC card slot 9A. The CPU 51, main memory 52, internal recording medium 53, external port 54, and interfaces 55, 56, 57, and 58 are interconnected over a bus.

Voice data may be read directly from the miniature card 10A via the PC card slot 9A. Alternatively, the voice data may be temporarily recorded in the internal recording medium 53 and read from the internal recording medium 53. Otherwise, the voice data may be read directly from the digital recorder 26 via a communication means or the like. Thus, the voice data reading means is not limited to the PC card slot.

Moreover, an example of screen display attained by running the control program in the personal computer is nearly identical to that shown in FIG. 3.

Figure 17:
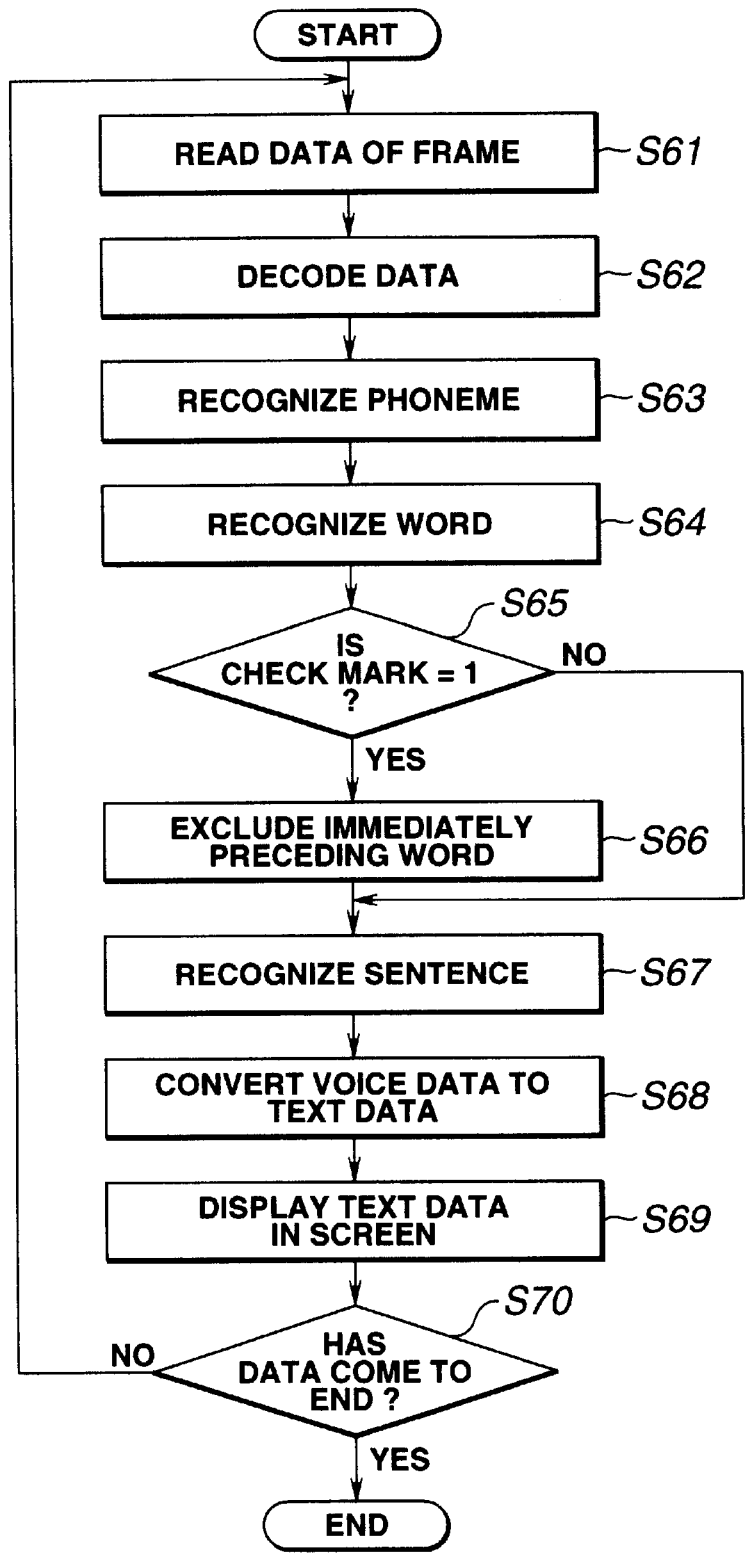
FIG. 17 is a flowchart describing speech recognition carried out in the personal computer of the second embodiment.

FIG. 17 is a flowchart describing processing of speech recognition carried out in the personal computer 1A.

The speech recognition is, as mentioned later, carried out stepwise in the order of phoneme recognition, word recognition, and sentence recognition.

Specifically, when the speech recognition start button 22 belonging to the speech recognition tool button group 21 in the tool button bar 13 in the main screen 11 is clicked, speech recognition is started. A voice file highlighted in the voice file list box 14 is read in units of a given frame (step S61), and decoded in units of the frame (step S62).

The decoded voice data is passed to the speech recognition program 29. First, a phoneme is identified (step S63). Word recognition is then carried out, wherein a word stream that matches input voice most satisfactorily is retrieved on the basis of a given language model suggested by the identified phoneme (step S64).

What is referred to as the language model is a model giving a probability of occurrence that suggests a given word stream. As the language model, various forms have been conceived. However, an efficient model taking account of unnecessary words or the like has not been devised yet.

In this embodiment, therefore, check mark information located at the start of each frame shown in FIG. 15 is checked to see if a word represented by data in a frame immediately preceding the frame is an unnecessary word or the like.

Specifically, it is judged whether or not the check mark information is 1 (step S65). If the check mark information is 1, a word represented by data in a frame immediately preceding the frame is not regarded as an object of processing of sentence recognition of the next step (step S66). If the check mark information is 0, sentence recognition is carried out (step S67).

Character conversion for converting voice data into character codes on the basis of a recognized sentence is then performed (step S68). The result of recognition is displayed in a screen on the display 3A (step S69).

Thereafter, it is judged whether or not the voice file has come to an end (step S70). If the voice file has not come to an end, control is returned to step S61. If the voice file has come to an end, the processing is terminated.

The processing of not regarding an unnecessary word as an object of recognition according to the result of detecting check mark information has been described to be carried out within the speech recognition program 29. The present invention is not limited to this mode. Alternatively, the processing may be carried out within, for example, the control program 28, and the result may be passed to the speech recognition program 29.

In this case, the control program 28 causes the personal computer 1A to fetch voice data from the miniature card 10A, and to detect check mark information appended to the voice data. If the check mark information is 1, the voice data is not passed to the speech recognition program 29. If the check mark information is 0, the voice data is passed to the speech recognition program 29.

Moreover, a word represented by data in a frame immediately preceding a frame including check mark information of 1 has been described to be not regarded as an object of recognition. The present invention is not limited to this mode. For example, a word represented by data in a frame including check mark information of 1 may not be regarded as an object of recognition.

Furthermore, the result of speech recognition has been described to be displayed as characters on the display 3A. The present invention is not limited to this mode. For example, the characters may be output as character data to a recording medium or may be displayed and output simultaneously.

The check mark information has been described to be recorded during recording by the digital recorder 26. Alternatively, the system may be configured so that the check mark information can be designated during reproduction by the digital recorder 26 or reproduction by the personal computer 1A.

According to the second embodiment, when a speaker presses the check mark button, a check mark is recorded in voice data. During processing of reproduction and speech recognition, the check mark is detected. A word represented by data in a frame having a check mark inscribed therein or a word represented by data in a frame preceding or succeeding the frame having the check mark inscribed therein is not regarded as an object of speech recognition. Consequently, treatment of an unnecessary word or the like which has not been able to be achieved in the past can be carried out easily without the need of increasing the load of speech recognition, that is, the need of especially fast processing. This results in a good-quality dictation system capable of achieving speech recognition properly and creating a document with few mistakes.

FIGS. 18 to 21 relate to the third embodiment of the present invention. The conceptual overall configuration of a dictation system of the third embodiment is identical to that shown in FIG. 12. Moreover, the electric configuration of the personal computer 1A is identical to that shown in FIG. 16.

Figure 18:
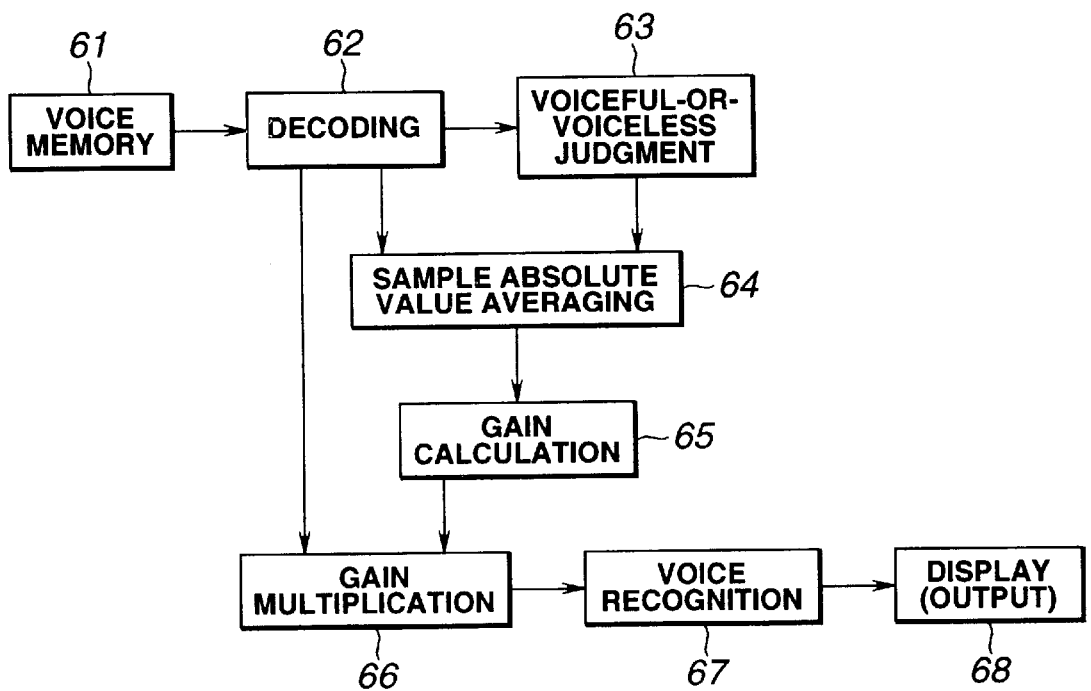
FIG. 18 is a diagram showing an overall flow of reading voice data from a voice memory and recognizing speech which is followed by the dictation system of the third embodiment of the present invention.
Figure 19:
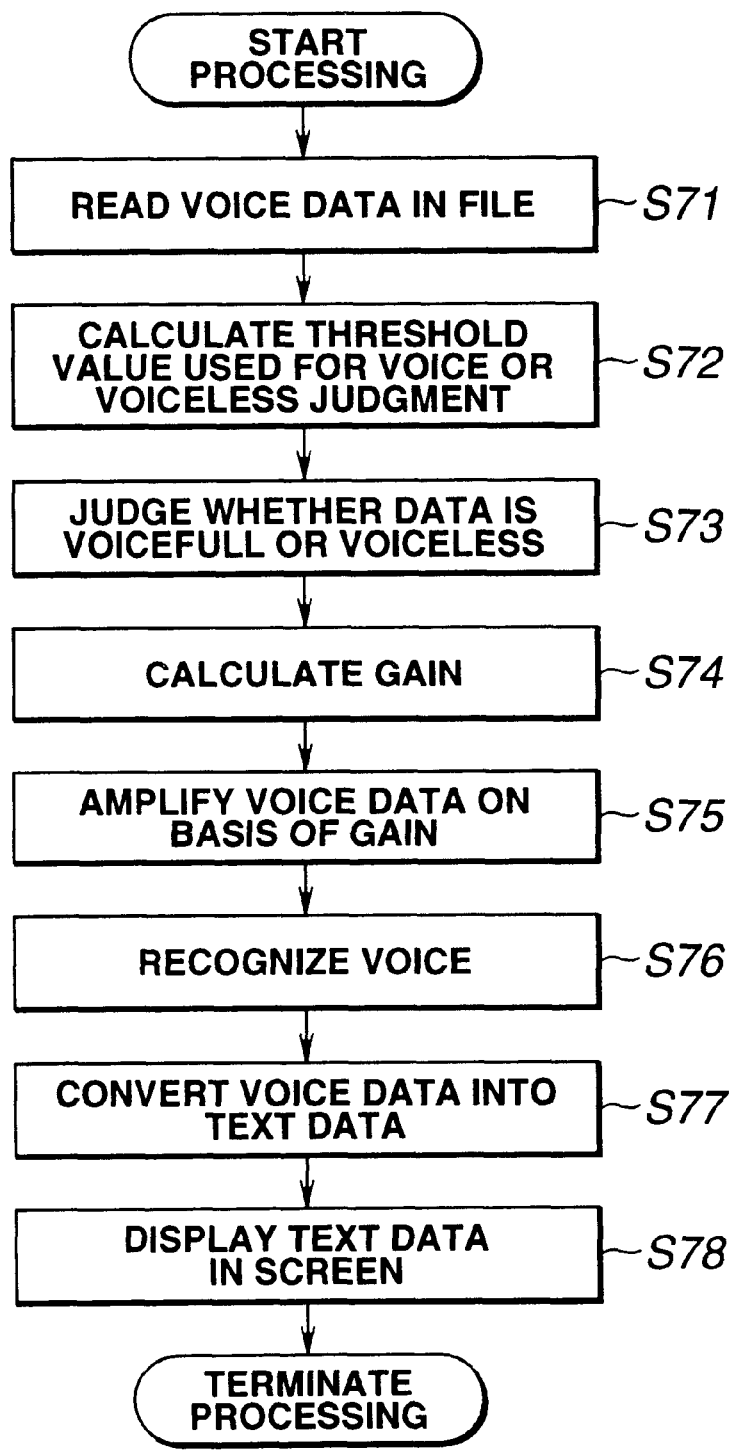
FIG. 19 is a flowchart describing speech recognition carried out by a dictation system of the third embodiment of the present invention.

Next, FIG. 18 is a diagram showing the overall flow of reading voice data from a voice memory and recognizing speech which is followed by the dictation system, and FIG. 19 is a flowchart describing processing of speech recognition carried out by the dictation system.

As described in FIG. 19, when the processing is started, voice data recorded in units of a file is read from a voice memory 61 in the miniature card 10A or internal recording medium 53, and Decoding 62 is executed (step S71).

The result of decoding 62 is sent to voice-or-voiceless Judgment 63 and Sample Absolute Value Averaging 64.

Voice-or-voiceless Judgment 63 calculates a threshold value used for voice-or-voiceless judgment (step S72). Based on the calculated threshold value, whether voice data is voice or voiceless is judged (step S73). This processing will be explained in detail later in conjunction with FIG. 20. The result of voice-or-voiceless judgment 63 is sent to Sample Absolute Value Averaging 64.

Sample Absolute Value Averaging 64 and Gain Calculation 65 are executed to calculate a gain (step S74). This processing will be described in conjunction with FIG. 21 later. Based on a gain calculated by Gain Calculation 65, Gain Multiplication 66 amplifies an output of Decoding 62 (step S75).

Voice data adjusted to a proper level by Gain Multiplication 66 is sent to Speech Recognition 67, whereby speech recognition is carried out (step S76).

Character conversion is carried out for converting the result of speech recognition into character codes (step S77). Resultant character codes are output and displayed 68 in a screen on the display 3A or the like (step S78).

Figure 20:
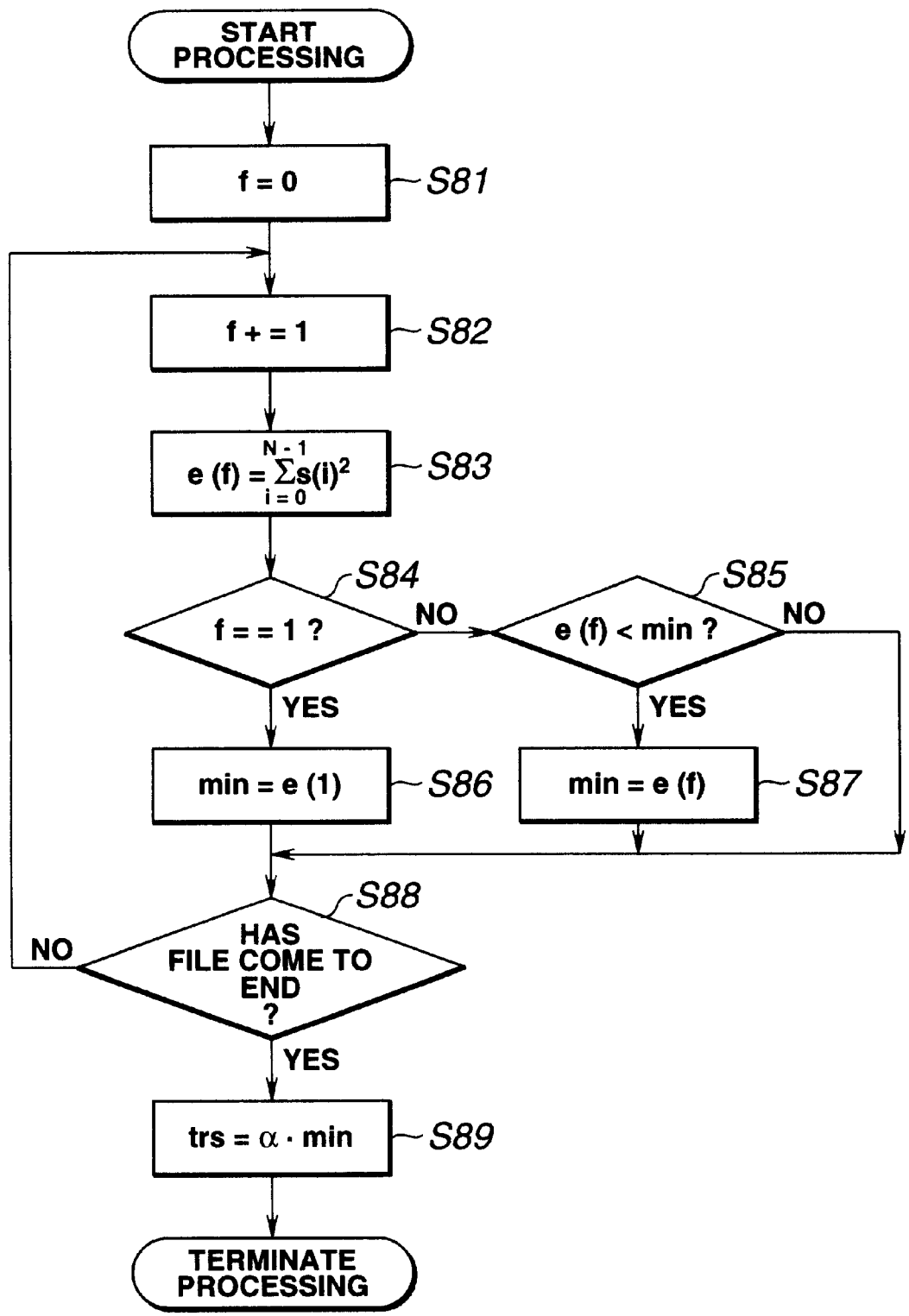
FIG. 20 is a flowchart describing the contents of processing relevant to judgment of voice or voiceless which is briefed in FIG. 19.

FIG. 20 is a flowchart describing the contents of processing relevant to voice-or-voiceless judgment performed at steps S72 and 573.

When this processing is started, first, a variable f indicating a count of the number of frames is initialized to 0 (step S81).

After the variable f is incremented (step S82), a level of frame energy e(f) is calculated according to an illustrated formula (step S83). In the formula, s(i) denotes an input signal of the (i-1)-th sample out of one frame, and N denotes the number of frames constituting one file.

It is then judged whether or not the variable f is 1, that is, a frame to be treated is an initial frame (step S84). If the variable f is 1, a variable min indicating a minimum level of frame energy is set to e(1) (step S86).

If it is found at step S84 that the variable f is not 1, it is judged whether or not the level of frame energy e(f) is smaller than the variable min (step S85). If the level of frame energy e(f) is smaller, the variable min is set to the level of frame energy e(f) (step S87). By contrast, if the level of frame energy e(f) is not smaller, nothing is done but control is passed to the next step S88.

It is then judged whether or not the file has come to an end (step S88). If the file has not come to an end, control is returned to step S82 and the foregoing processing is repeated.

If it is judged at step S88 that the file has come to an end, a product of the variable min by a given value a (for example, 1.8) is set as a threshold value trs (step S89). The processing is then exited.

This procedure of setting a threshold value is making the most of the fact that voice data is already recorded. Since the threshold value can be determined on the basis of the minimum energy level of the whole file, voice-or voiceless judgment can be achieved with a little error.

As described above, minimum values of all read intervals (that is, all the frames constituting a voice file) are calculated. The present invention is not limited to this mode. Instead of the minimum values of all the intervals, a minimum value of an interval of a certain length will do.

Figure 21:
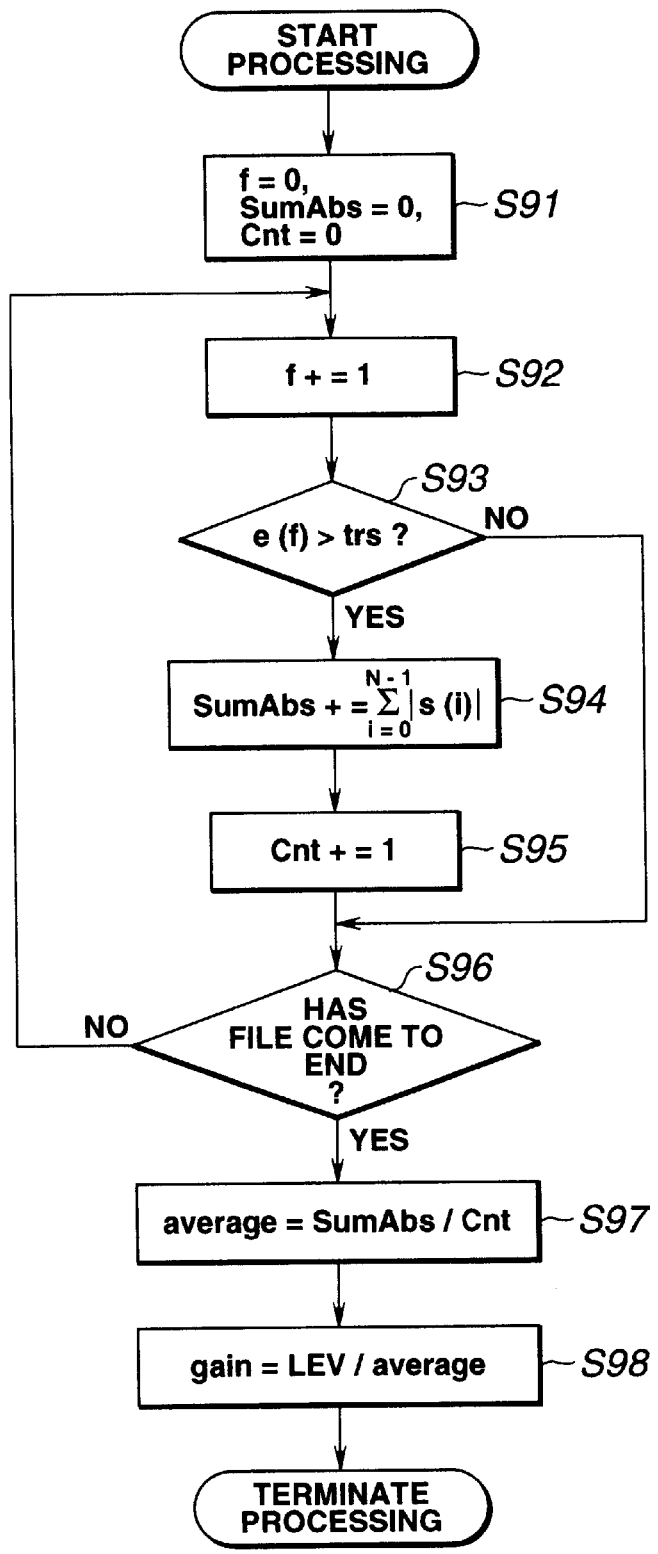
FIG. 21 is a flowchart describing the contents of gain calculation briefed in FIG. 19.

Next, FIG. 21 is a flowchart describing the contents of gain calculation to be performed at step S74 in FIG. 19.

When this processing is started, a variable f indicating a count of the number of frames, a variable SumAbs indicating a sum of absolute values of samples, and a variable Cnt indicating the number of additions are initialized to Os (step S91).

The variable f is then incremented (step S92). It is judged whether or not the level of frame energy e(f) calculated within the processing described in FIG. 20 is larger than the threshold value trs (step S93). If the level of frame energy e(f) is larger than the threshold value trs, the sum of absolute values of samples of frames is added to the variable SumAbs (step S94), and the variable Cnt is incremented (step S95).

If it is found at step S93 that the level of frame energy e(f) is equal to or smaller than the threshold value, control is passed to the next step S96. Thereafter, it is judged whether or not the file has come to an 'end (step S96). If the file has not come to an end, control is returned to step S92 and the foregoing processing is repeated.

If it is judged at step S96 that the file has come to an end, the variable SumAbs is divided by the variable Cnt in order to calculate an average value, average, of the absolute. values of samples of frames (step S97).

A given value LEV is divided by the average value, average, in order to calculate a gain, (step S98). Herein, the given value LEV is set to the average value of the predicted absolute values of samples. For example, an average value of absolute values of voice samples used to learn voice data by a recognizer is employed.

According to the third embodiment, already-recorded voice data can be adjusted to a sound level suitable for recognition. Speech recognition can therefore be carried out on a stable basis irrespective of a sound level of recorded voice data. This results in a high-quality dictation system.

In this invention, it is apparent that a wide range of different working modes can be formed on the basis of the invention without a departure from the spirit and scope of the invention. This invention is not restricted to any specific embodiment but as may be limited by the appended claims.

What is claimed is:

1. A recording medium for use with a computer and having a speech recognition program recorded therein, wherein said speech recognition program causes a computer to:

read voice data from a voice data recording medium in which the voice data is recorded;

read a control condition manually inputted into said computer;

recognize speech represented by the voice data so as to convert it into text data;

limit the conversion of text data according to the control condition; and display the text data;

said speech recognition program, responsive to said control condition, which includes a manually inputted time interval and a manually inputted number of words, causes the computer to recognize only a given number of words of voice data according to the manually inputted number of words, at intervals determined by the inputted time interval number, and to convert said given number of words of voice data into text data.

2. A speech recognition apparatus according to claim 1, wherein voice data recorded in said voice data recording medium is compressed digital voice data.

3. A recording medium for use with a computer and having a speech recognition program recorded therein, wherein said speech recognition program causes a computer to:

read voice data from a voice data recording medium in which the voice data is recorded;

read a control condition manually inputted into said computer;

recognize speech represented by the voice data so as to convert it into text data;

limit the conversion into text data according to the control condition; and display the text data;

wherein said speech recognition program, responsive to said control condition, which includes a manually inputted original position in said voice data recording medium and a number of words starting at said original position, further causes the computer to recognize only the manually inputted number of words starting at the manually inputted original position in said voice data recording medium having voice data recorded therein and to convert them into text when causing the computer to recognize speech represented by the voice data and convert it to text data.

4. A recording medium having a speech recognition program recorded therein, wherein said voice recognition program causes a computer to:

read voice data from a voice recording medium in which the voice data is recorded;

recognize a control condition manually inputted into the computer, which condition is a given word; and recognize speech represented by the voice data so as to detect the given word; and indicate original positions of the given word in the voice recording medium responsive to the control condition, process the voice data so as to recognize occurrences of the given word therein, and indicate the original positions of the given word in said voice data.

5. A recording medium having a speech recognition program recorded therein according to claim 4, wherein said speech recognition program further causes the computer to create an index mark at the original positions of the given word in said voice data recording medium having the voice data recorded therein after causing the computer to recognize speech represented by the voice data and detect the given word.

6. A recording medium having a speech recognition program recorded therein according to claim 5, wherein said speech recognition program responsive to said control condition, further causes the computer to reproduce voice data starting at a given original position in said voice data recording medium having the voice data recorded therein after causing the computer to indicate the original positions of the given word.

7. A recording medium having a speech recognition program recorded therein according to claim 4, wherein said speech recognition program further causes the computer to indicate the position of the given word in a position of reproduction indicative of the voice data.

8. A recording medium having a speech recognition program recorded therein, wherein said speech recognition program causes a computer to:

read voice data from a voice data recording medium in which the voice data is recorded;

recognize speech represented by the voice data so as to convert it into text data;

display the text data;

recognizing a control designation manually inputted into said computer;

designating at least part of the text data responsive to said control designation; and delete a portion of the voice data corresponding to a portion of the text data designated responsive to said control designation from said voice data recording medium, and cancel display of the designated portion of the text data.

9. A recording medium having a speech recognition program recorded therein, wherein said speech recognition program causes a computer to:

read voice data from the voice data recording medium in which the voice data is recorded;

recognize speech represented by the voice data so as to convert it into text data;

acquire position information of positions in said voice data recording medium, at which portions of the voice data corresponding to words of the text data are recorded, in one-to-one correspondence with the words;

display the text data;

recognize a control condition manually inputted into the computer designating at least a portion of the text data;

acquire position information of original positions in said voice data recording medium, at which a corresponding portion of the voice data is recorded, according to a word contained in a portion of the text data designated; and delete a corresponding portion of the voice data from said voice data recording medium having the voice data recorded therein based on the position information, and cancel display of the designated portion of the text data.

10. A speech recognition apparatus, comprising:

a voice data reading means for reading voice data from a voice data recording medium in which the voice data is recorded;

a detecting means for detecting a check mark that is appended to the voice data and distinguishes an interval within the voice data;

a speech recognition means for ignoring a portion of the data associated with the given check mark and recognizing speech represented by another portion of the voice data; and a display means for displaying the result of recognition performed by said speech recognition means.

11. A speech recognition apparatus according to claim 10, wherein, the check mark is recorded by a voice recording apparatus including:

a voice data input means for inputting voice data;

an interval designating means enabling designation of a desired interval within the voice data input by said voice data input means;

a recording means for appending a check mark, which distinguishes the interval designated using said interval designating means, to the voice data and recording the voice data in a voice data recording medium; and a recording medium attaching means for use in freely detachably attaching said voice data recording medium.

12. Speech recognition apparatus according to claim 10, wherein said speech recognition means ignores one of the words just before the frame having the given check mark recorded therein and/or the word which includes the frame having the check mark recorded therein.

13. A recording medium having a speech recognition program recorded therein, wherein said speech recognition program causes a computer to:

read voice data from a voice data recording medium in which the voice data is recorded;

detect a check mark that is appended to the voice data and distinguishes an interval within the voice data;

ignore a portion of the voice data associated with the given check mark and recognize speech represented by another portion of the voice data; and display the result of speech recognition.

14. Speech recognition apparatus according to claim 13, wherein said speech recognition means ignores one of the words just before the frame having the given check mark recorded therein and/or the word which includes the frame having the check mark recorded therein.

15. A speech recognition apparatus for recognizing speech within a programmed computer, comprising:
- a voice data reading means for reading voice data from a voice data recording medium in which the voice data is recorded;
- means for manually inputting a control condition;
- a speech recognition means for recognizing speech represented by the voice data and converting it into text data; and said speech recognition means including means responsive to said control condition to perform speech recognition according to the control condition;
- a display means for displaying the text data,
- said speech recognition program, responsive to said control condition, further causing the computer to recognize only a given number of words and convert them into text data at intervals of a given time when causing the computer to recognize speech represented by the voice data and convert it into text data; and
- further including an attachment for receiving said voice data recording medium.

16. A voice recognition apparatus according to claim 15, wherein said voice data recording medium is attached to said attachment via an adaptor.

* * * * *